US009565625B1

(12) United States Patent
MacNeille et al.

(10) Patent No.: US 9,565,625 B1
(45) Date of Patent: Feb. 7, 2017

(54) MULTIPROTOCOL VEHICLE COMMUNICATIONS

(71) Applicant: Ford Global Technologies, LLC, Dearborn, MI (US)

(72) Inventors: Perry Robinson MacNeille, Lathrup Village, MI (US); Oleg Yurievitch Gusikhin, West Bloomfield, MI (US); Aziz Makkiya, Troy, MI (US); David Anthony Hatton, Berkley, MI (US); Leonid Mikhailovich Kurochkin, Saint Petersburg (RU); Sergei Gennadevich Popov, Saint Petersburg (RU); Vadim Valerievich Glazunov, Saint Petersburg (RU); Mikhail Aleksandrovich Kurochkin, Saint Petersburg (RU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/848,604

(22) Filed: Sep. 9, 2015

(51) Int. Cl.
*H04W 24/00* (2009.01)
*H04W 48/18* (2009.01)
*H04W 4/02* (2009.01)
*H04B 17/373* (2015.01)

(52) U.S. Cl.
CPC .......... *H04W 48/18* (2013.01); *H04B 17/373* (2015.01); *H04W 4/02* (2013.01)

(58) Field of Classification Search
CPC ........ H04W 4/02; H04W 4/025; H04W 4/027; H04W 4/028; H04W 4/046
USPC .......................... 455/456.1, 456.2, 456.6, 457
See application file for complete search history.

(56) References Cited

U.S. PATENT DOCUMENTS

| 7,373,152 | B2 | 5/2008 | Oesterling | |
|---|---|---|---|---|
| 9,002,634 | B1* | 4/2015 | Kalyanasundaram | H04W 40/18 370/401 |
| 2005/0156715 | A1* | 7/2005 | Zou | B60R 25/1025 340/426.19 |
| 2006/0183487 | A1 | 8/2006 | Allen | |
| 2007/0211676 | A1* | 9/2007 | Sharma | G01C 21/3461 370/338 |
| 2008/0183380 | A1* | 7/2008 | Blackwood | G01C 21/26 701/420 |

(Continued)

FOREIGN PATENT DOCUMENTS

CN        103500503 A      1/2014

OTHER PUBLICATIONS

US 8,972,170, 03/2015, Dave (withdrawn)
(Continued)

*Primary Examiner* — Temica M Beamer
(74) *Attorney, Agent, or Firm* — Frank A. MacKenzie; Bejin Bieneman PLC

(57) ABSTRACT

A system includes a computer including a processor. The processor is programmed to receive data mapping one or more predicted signal metrics for each of one or more types of wireless communications within a geographic area. Based on optimization targets, the processor is programmed to select, for a vehicle travelling along a planned path within the geographic area, a respective type of communications to be used respectively for each area along the planned path. The processor is further programmed to activate the selected type of communications when the vehicle is within the respective area.

25 Claims, 15 Drawing Sheets

(56) References Cited

U.S. PATENT DOCUMENTS

| | | | |
|---|---|---|---|
| 2011/0144899 A1* | 6/2011 | Soelberg | G01C 21/3461 701/532 |
| 2011/0172906 A1* | 7/2011 | Das | G01C 21/20 701/533 |
| 2013/0325317 A1* | 12/2013 | Pylappan | G01C 21/26 701/409 |
| 2014/0278070 A1* | 9/2014 | McGavran | G01C 21/00 701/465 |
| 2014/0278074 A1 | 9/2014 | Annapureddy | |
| 2015/0019124 A1* | 1/2015 | Bandyopadhyay | G01C 17/38 701/410 |
| 2016/0044129 A1* | 2/2016 | Bergmann | H04L 67/2847 455/406 |

OTHER PUBLICATIONS

Popov, Serge; Chuvatov, Mikhail; Glazunov, Vadim; Kurochkin Michail, Methods of interaction between multiprotocol unit nad telematics map cloud service; Russia.

* cited by examiner

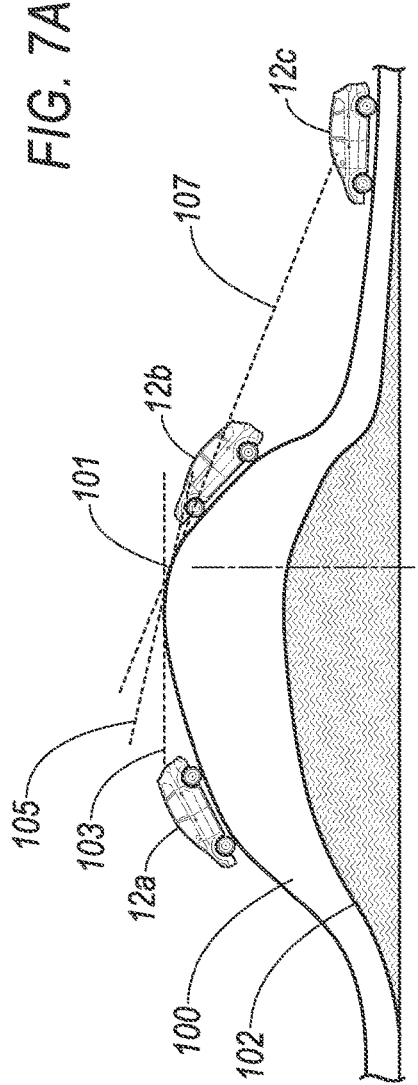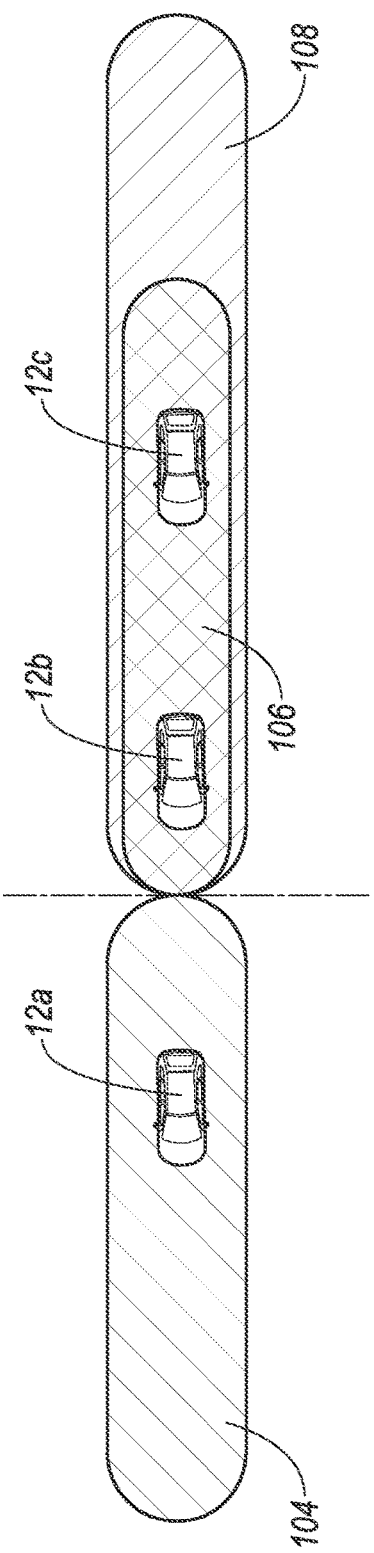

MULTIPROTOCOL VEHICLE COMMUNICATIONS

BACKGROUND

Vehicles may be equipped for various types of wireless communications such as satellite, cellular, dedicated short range communications (DSRC), radio frequency (RF) and digital radio. Increasingly, in addition to using wireless communications for entertainment, vehicle operators rely on data from these wireless communications to track vehicle location, monitor traffic along a planned travel route, receive weather updates, etc. All types of wireless communication are not, however, available in all locations. For example, a signal from a cell tower may be lost as the vehicle moves through the shadow of a mountain. In some locations, only particular types of communications or no communications at all, may be available.

DRAWINGS

FIG. 7*a* is a diagram of three vehicles travelling on an exemplary road including a hill and a water table.

FIG. 7*b* is a diagram indicating an exemplary influence of the hill and the water table of FIG. 7*a* on dedicated short range communications (DSRC).

Figure 8:
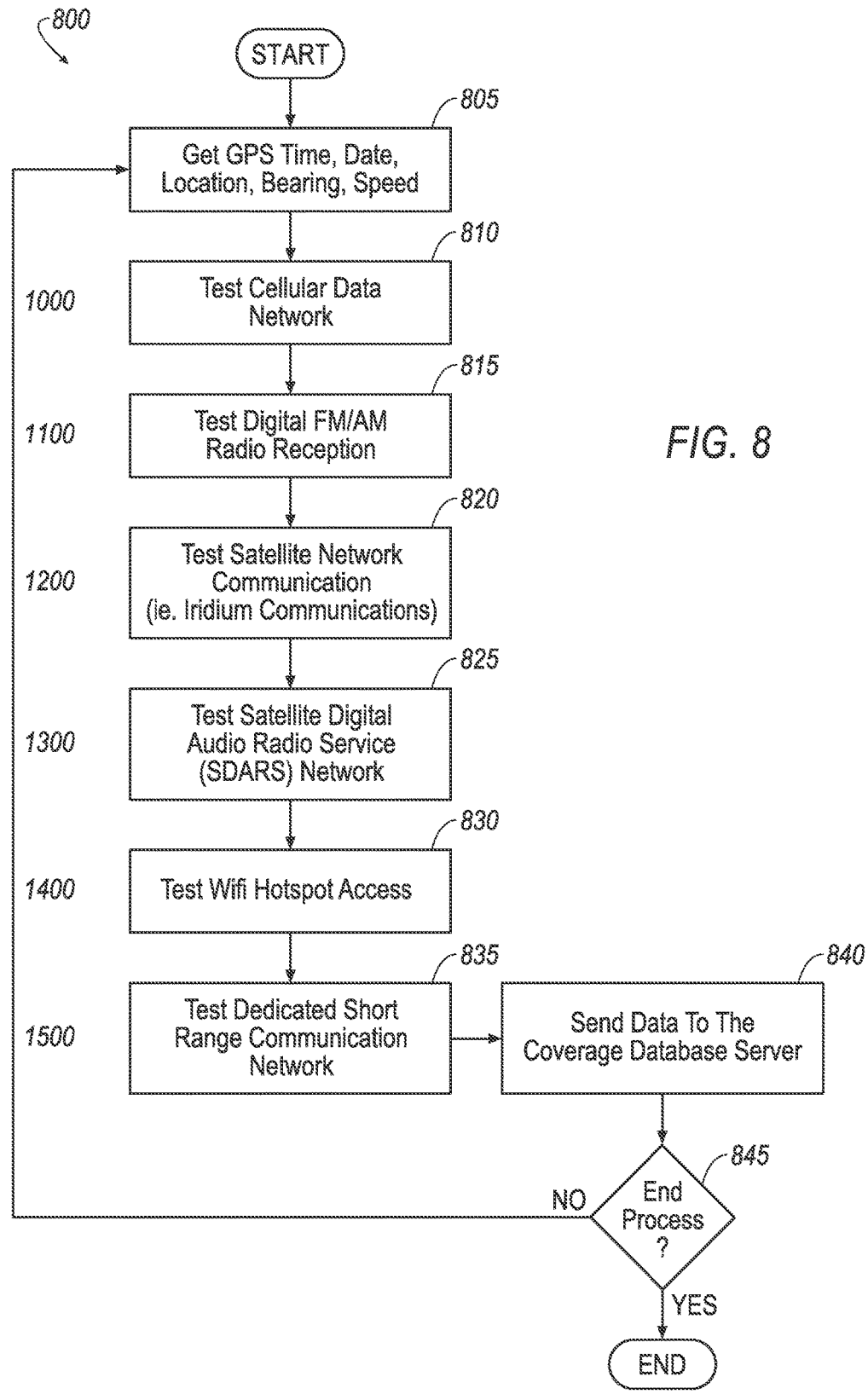

FIG. 8 is a flow diagram of an exemplary process for measuring a performance for each of multiple communications protocols.

Figure 9:
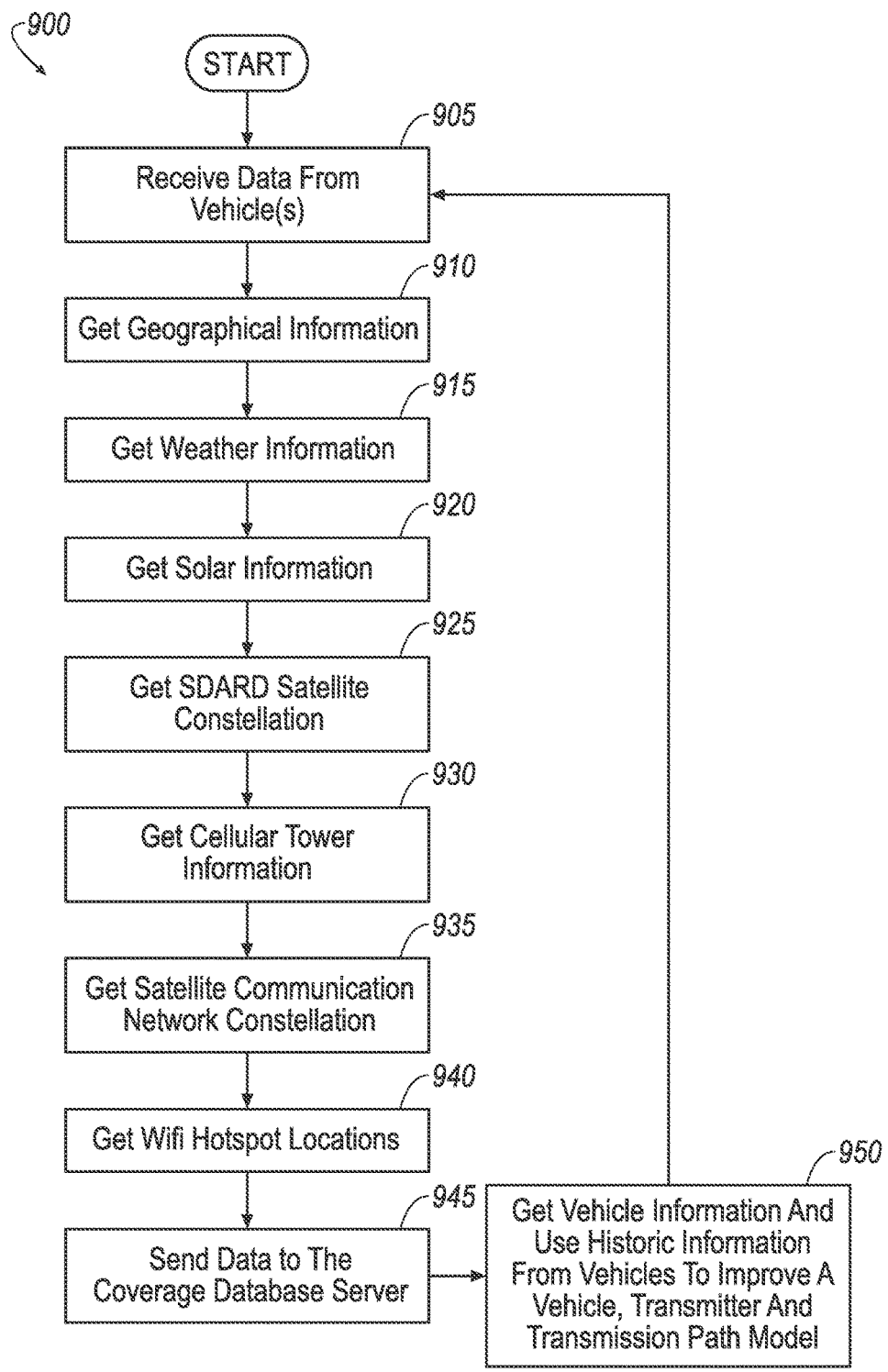

FIG. 9 is a flow diagram of an exemplary process for generating a coverage map indicating performance distributions of each of the multiple communications protocols.

Figure 10:
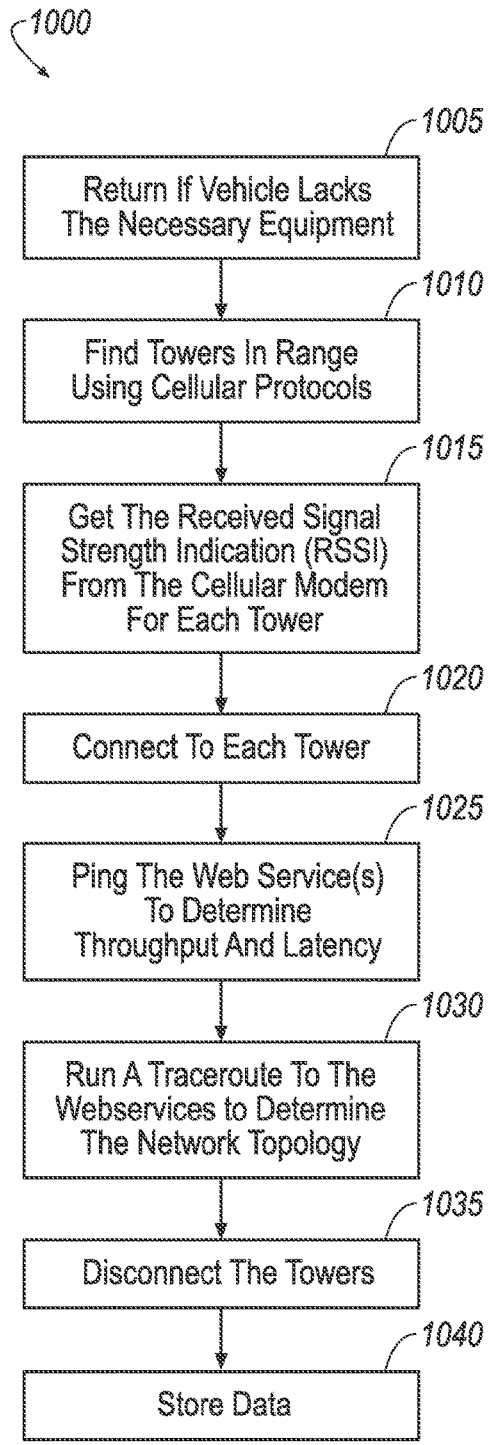

FIG. 10 is a flow diagram of an exemplary process to measure performance metrics of cellular communications.

Figure 11:
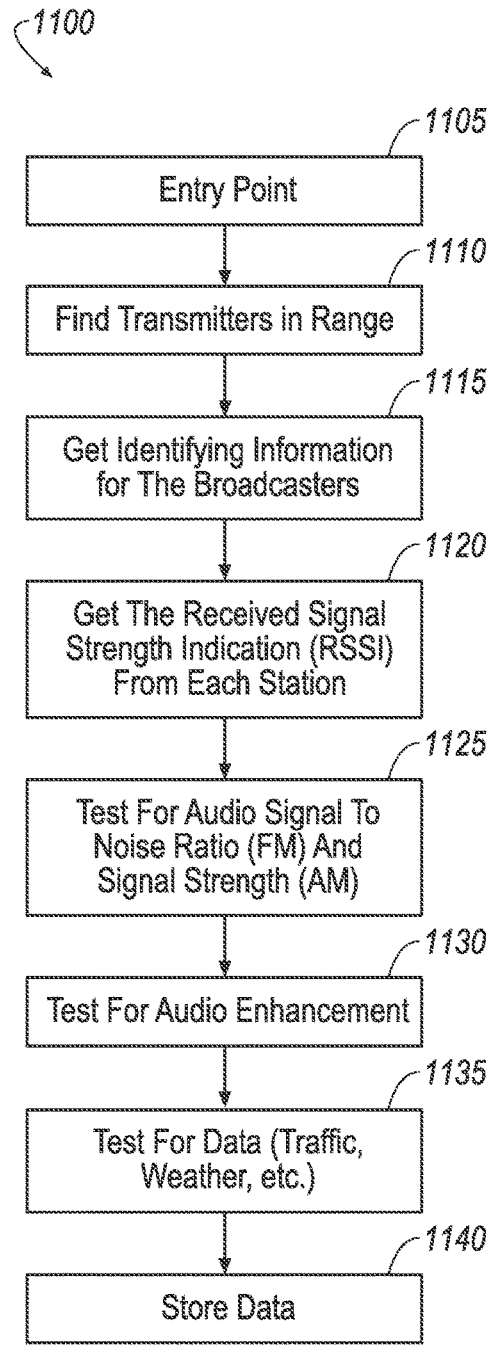

FIG. 11 is a flow diagram of an exemplary process to measure performance metrics of digital AM/FM radio stations.

Figure 12:
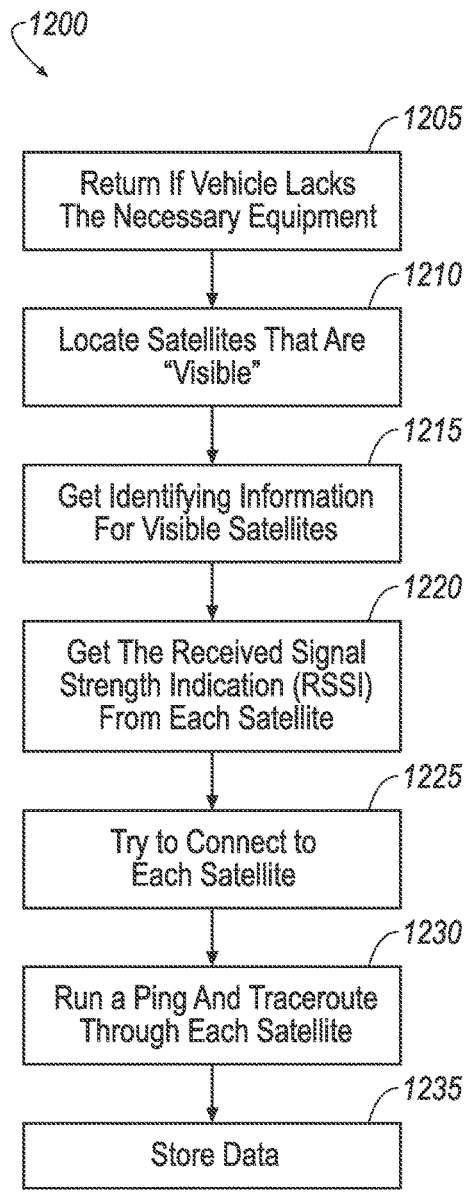

FIG. 12 is a flow diagram of an exemplary process to measure performance metrics of satellite network communications.

Figure 13:
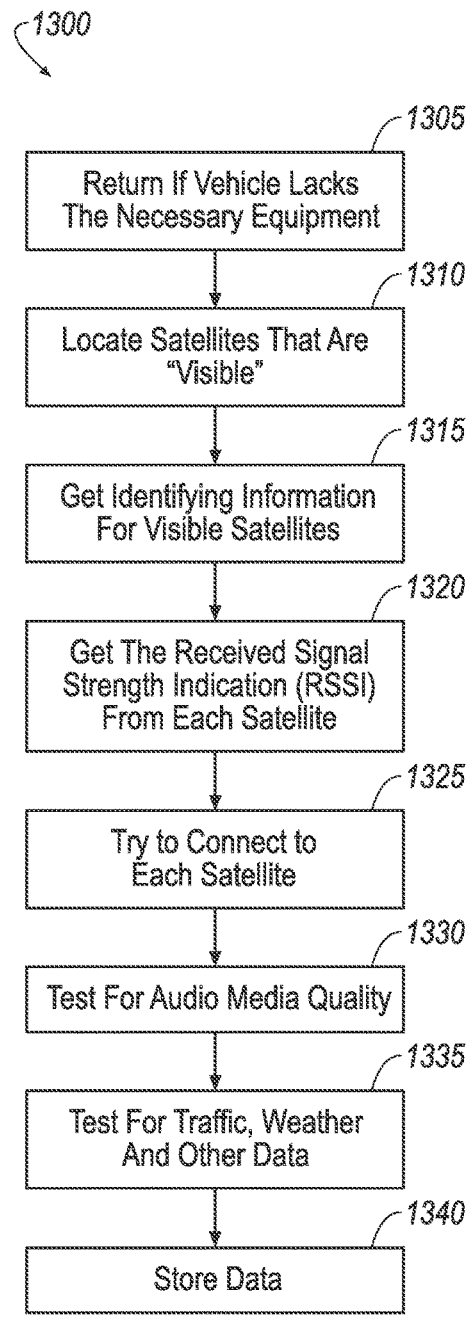

FIG. 13 is a flow diagram of an exemplary process to measure performance metrics of satellite digital audio radio service (SDARS) communications.

Figure 14:
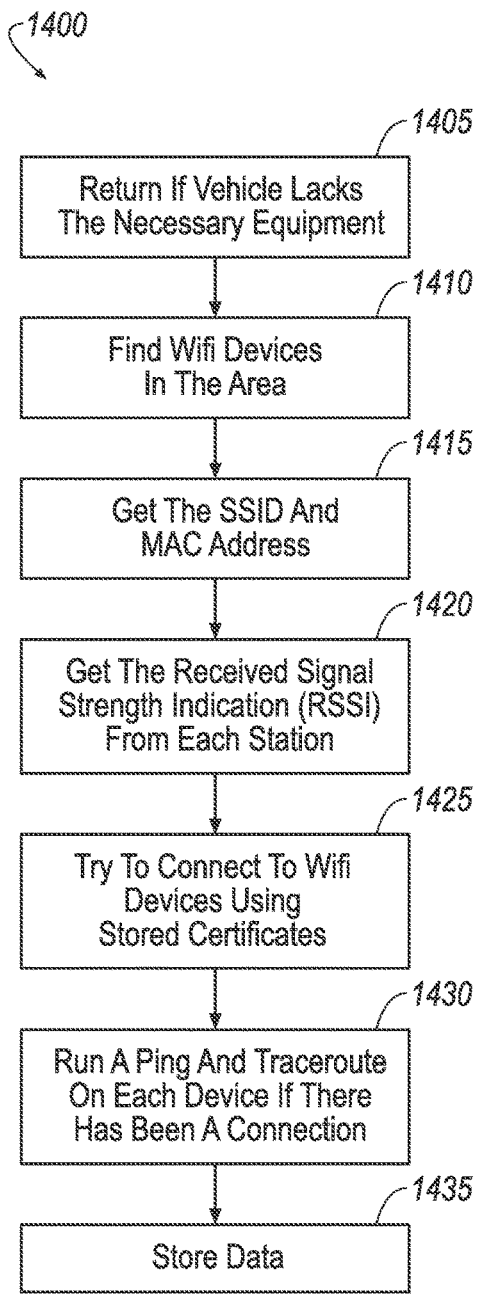

FIG. 14 is a flow diagram of an exemplary process to measure performance metrics of WiFi communications.

Figure 15:
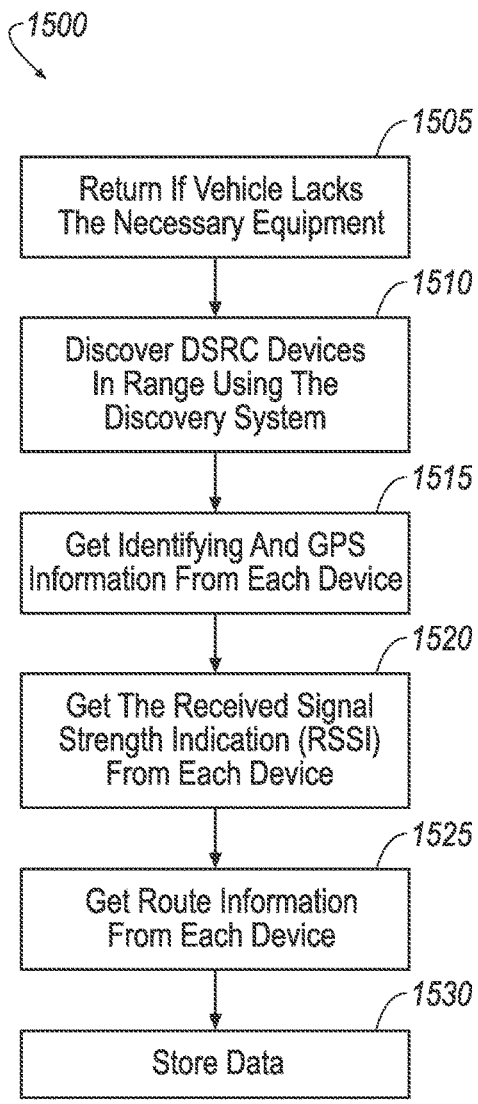

FIG. 15 is a flow diagram of an exemplary process to measure performance metrics of dedicated short range communications (DSRC).

Figure 16:
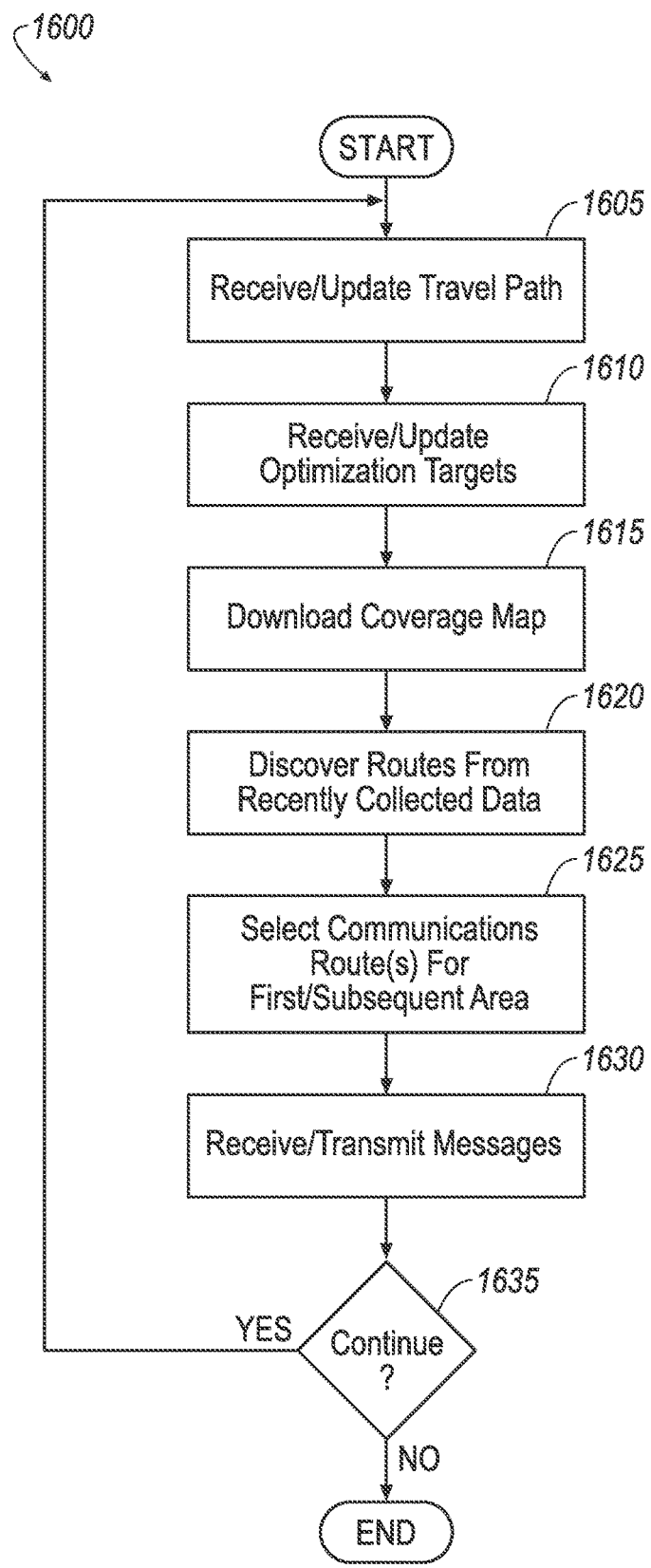

FIG. 16 is a flow diagram of an exemplary process to determine and execute a communications plan.

Figure 17:
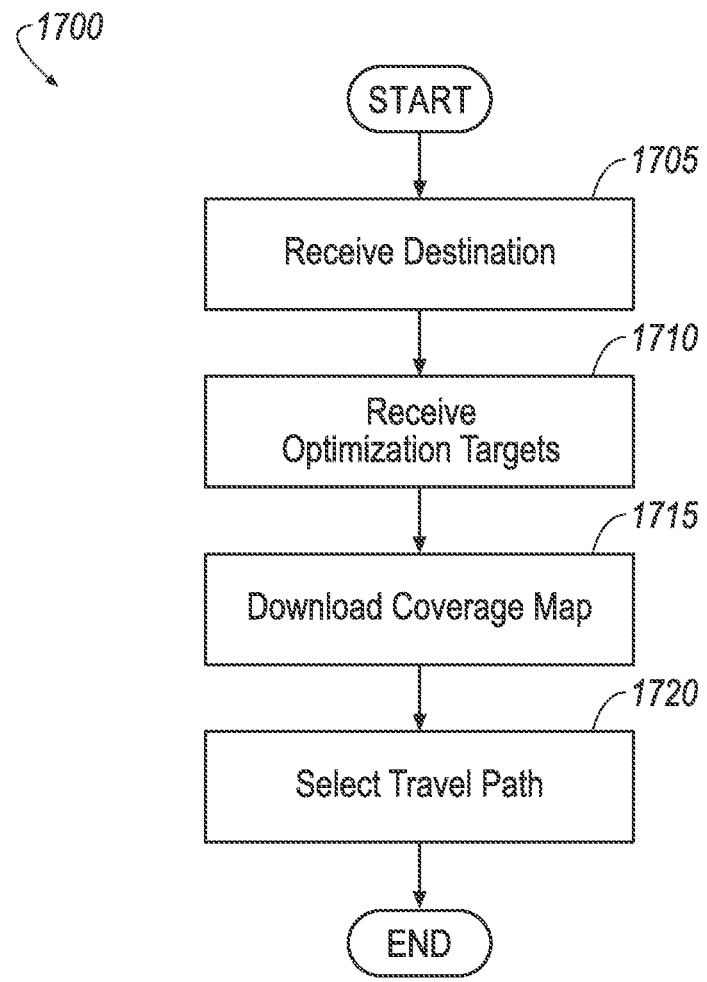

FIG. 17 is a flow diagram of an exemplary process to determine an optimal travel path based on optimization targets.

Figure 18:
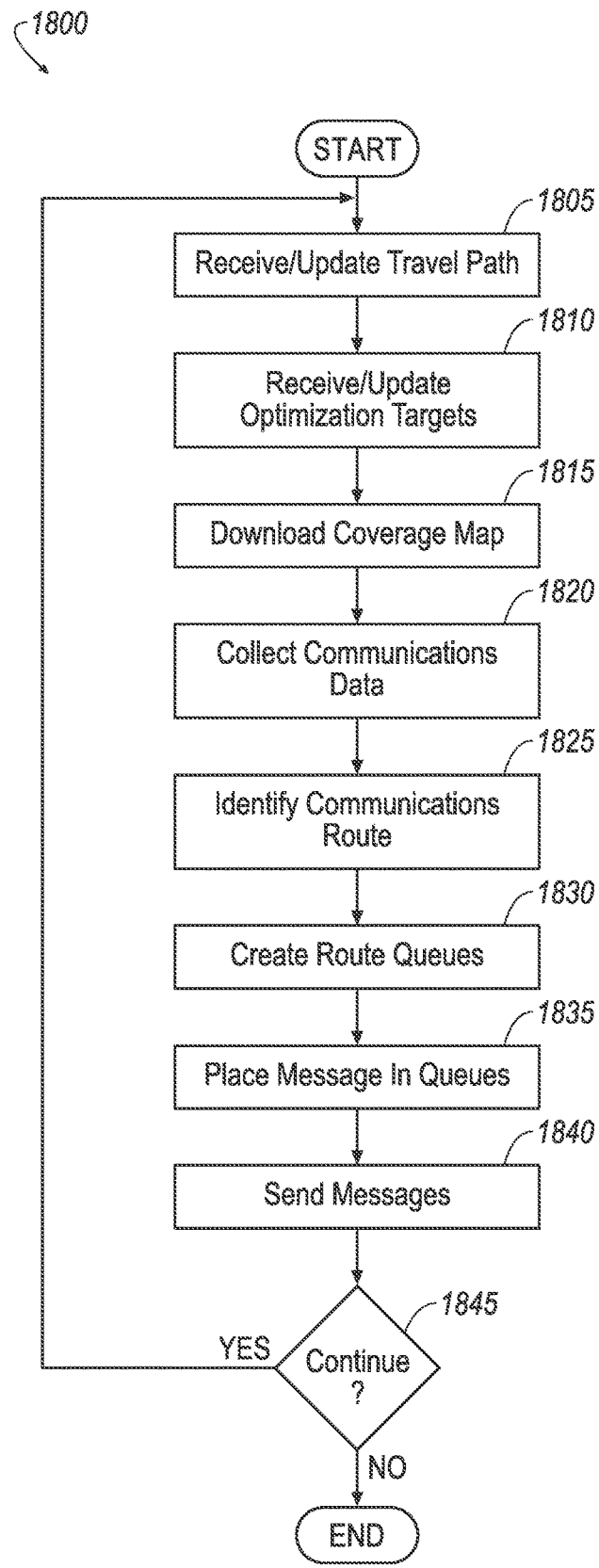

FIG. 18 is a flow diagram of an exemplary process to optimize the transmission of data based on a coverage map.

DETAILED DESCRIPTION

Exemplary System

Figure 1:
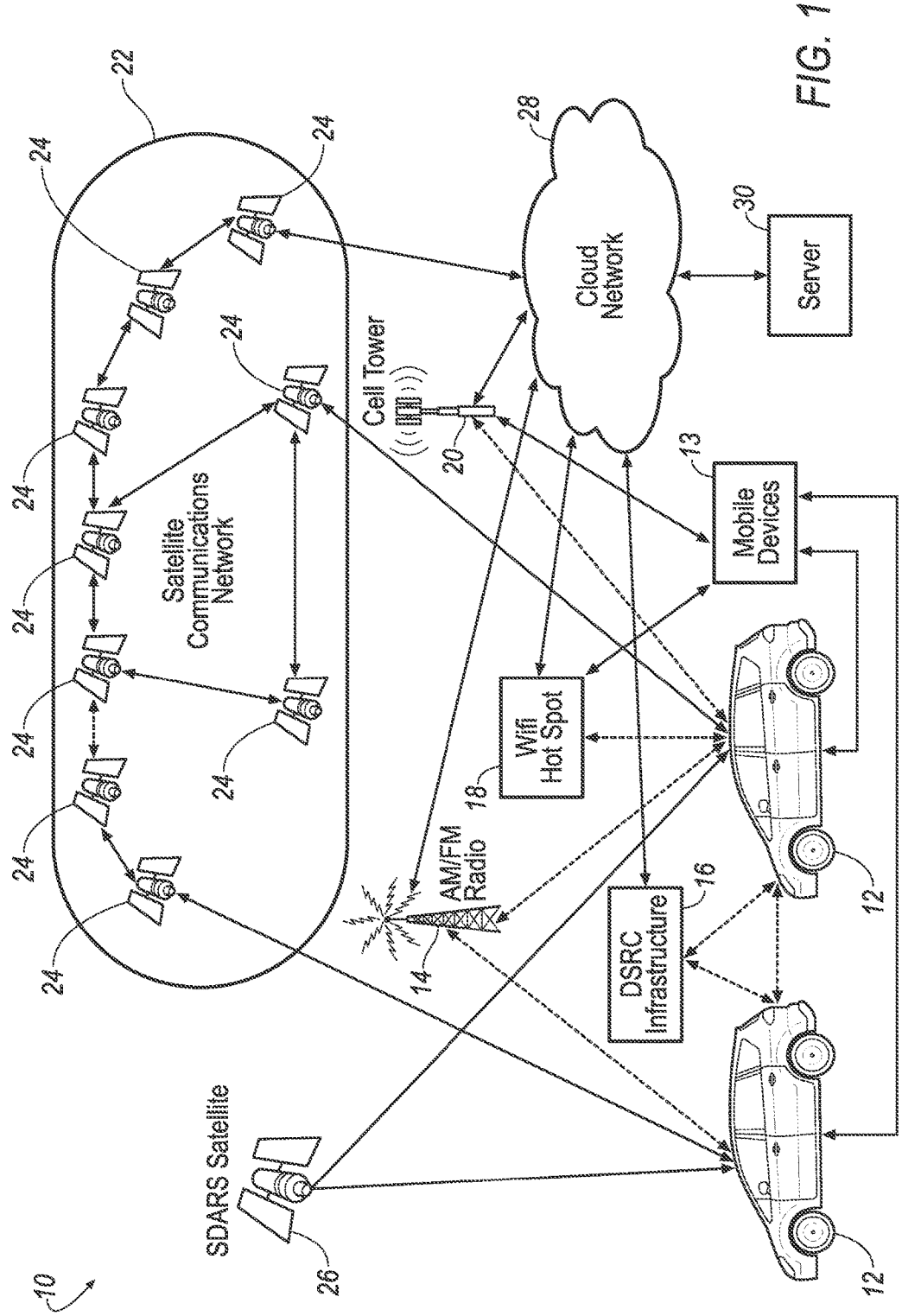
FIG. 1 is a diagram of an exemplary system for multiprotocol communications.

Referring to FIG. 1, a system 10 generates a coverage map including signal distributions for multiple types of communications and provides this map to vehicles 12 travelling in a geographic area. The signal distributions may indicate one or more metrics of a signal at one or more locations on the geographical map. The one or more metrics may include, e.g., a signal strength for a particular signal type of communications at a particular location, a signal transmission latency when a message is transmitted from that point to a reference location such as a server 30, a signal-to-noise ratio of signals received at a particular location, etc. The signal distributions may be, e.g., dynamically updated, to account for the influence of weather conditions, solar conditions, loading, etc. A vehicle 12 can thereby select one or more types of communications in different areas along a path. Communications may thus be optimized according to predefined optimization targets.

The different types of communications may include terrestrial or satellite one-way and two-way radio communications including AM/FM radio communications, digital AM/FM radio communications, global positioning system communications, WiFi communications, dedicated short range communications (DSRC), cellular communications, satellite communications, emergency and navigation communications, packet network communications such as the Internet, etc. Optimization targets for optimizing communications along a path may include, for example, maximizing a signal strength of communications along a path, maximizing a connection time of communications along the path, minimizing a cost associated with communications along the path, maximizing the availability of a broadcast (e.g., sports event), along the path, etc.

For example, a user may wish to maximize a signal strength of communications along the path. Based on this goal, and data from the coverage map, the vehicle 12 may switch from a first type of communications to a second type of communications when entering an area where a signal strength of a first type of communications is weak relative to a signal strength of a second type of communications.

Additionally, the system 10 may enable a vehicle 12 to select a path from a current location to a destination in order to optimize communications according to predefined optimization targets. For example, in a case where the predefined optimization target is to maximize a signal strength of communications during a trip from the current location to the destination, the vehicle 12 may, based on the coverage map, select a path which has the fewest number of areas where there is no signal with a strength above a predetermined threshold available from any of the types of communications. The predetermined threshold may be, for example, a power level above which a user can expect a communications connection to be continuous (i.e., without interruption). As another example, a predetermined threshold may be a power level indicated by two bars, according to a received signal strength indication (RSSI).

The system 10 may include one or more vehicles 12, one or more mobile devices 13, one or more AM/FM radio transmitters 14, one or more dedicated short range communications infrastructures (DSRC) 16, one or more WiFi hotspots 18, one or more cellular towers 20, one or more satellite networks 22, one or more satellite digital audio radio service (SDARS) satellites 26; one or more cloud networks 28 and one or more servers 30. The one or more vehicles 12, one or more mobile devices 13, one or more AM/FM radio transmitters 14, one or more dedicated short range communications infrastructures 16, one or more satellite digital audio radio service (SDARS) satellites 26; one or more cloud networks 28 and one or more servers 30, and other directly or indirectly communicatively coupled devices may be referred to collectively as networked devices herein.

The vehicles 12 may be directly communicatively coupled with one or more of the mobile devices 13, AM/FM radio 14, the DSRC infrastructure 16, the WiFi hotspots 18, the cellular towers 20, the satellite communications networks 22 and the SDARS satellites 26. Additionally, the vehicles 12 may be indirectly communicatively coupled with one or more of the cloud networks 28 via the DSRC infrastructures 16, WiFi hotspots 18, cellular towers 20, the one or more satellite communications networks 22, etc. The one or more vehicles 12 may further be indirectly communicatively coupled with the one or more servers 30 via one or more cloud networks 28.

The vehicle 12 may, e.g., send a message to the server 30 indicating a location of the vehicle 12, and an intended destination, and requesting a coverage map, including a performance distribution for each of one or more types of communications. The performance distribution may include, e.g., a signal strength distribution, a latency distribution, etc. The server 30 may generate a coverage map for the travel area between the location and the destination and transmit the coverage map to the vehicle 12.

Based on the coverage map 12, and predefined optimization targets, the vehicle 12 may, e.g., select one or more types of communications to be used in particular areas along a path, or select a path with the availability of a particular type of communications for a portion of a trip, etc.

Mobile devices 13 include a computer including a processor and a memory, and a communications circuit. The communications circuit may include circuitry including hardware, software, firmware, etc. for communications with cellular towers 20, hotspots 18 and also for wireless or wired communications, e.g., Bluetooth communications, with the computer 44 in the vehicle 12. The mobile devices 13 may, for example, receive traffic data from the cloud network 28 via a hotspot 18, and synchronize this data with the vehicle 12 via a Sync connection.

The AM/FM (amplitude modulation/frequency modulation) radio 14 may transmit AM and FM radio stations as are known. AM radio stations may transmit radio frequency signals in a frequency range of 535 to 1700 kilo Hertz (kHz). FM radio stations may transmit signals in a frequency range of 87.5 to 108 mega Hertz (MHz). In addition, the AM/FM radio may transmit signals to the cloud network 28. For example, an FM radio station 14 may transmit programming to a computing device associated with the cloud network 28. The computing device may make the programming available via the cloud network 28 to other computing devices communicatively coupled to the cloud network 28.

The dedicated short range communications (DSRC) infrastructure 16 may include one or more transceivers radio frequency communications, and may operate, e.g., in the DSRC band (5.9 GHz). DSRC infrastructure 16 may be present along roadways, and may be, for example, included in traffic signs, traffic lights, etc. As described below, a communications circuit 40 in the vehicle 12 may include circuitry for dedicated short range communications, which may be used for communications with other vehicles (V2V), and with the DSRC infrastructure (V2I).

Further, as indicated on FIG. 1, the DSRC infrastructure 16 may include transceivers for communicating with the cloud network 28.

The WiFi hotspot 18 may be used for connecting networked devices such as the one or more vehicles 12 to the cloud network 28. The WiFi hotspot 18 may include a router for WiFi communications (typically 2.4 GHz or 5 GHz bands) and may be operable to receive multiple transmissions substantially simultaneously. For example, the router may receive transmissions from the one or more vehicles 12, and/or, e.g., from one or more mobile devices 13.

Additionally, the hotspot 18 may communicate with the cloud network 28, via, e.g., satellite communications or a cable network. The hotspot 18 may include a transceiver and antenna for satellite communications, e.g., in the Ka band (18.3-30 GHz) or transceiver adapted to cable communications. The hotspot 18 may receive, via the cloud network 28, e.g., Internet protocol (IP) communications from, e.g., the server 30.

Connecting with a WiFi hotspot 18 takes time and often requires the use of a password. It may be difficult for vehicles 12 to connect with WiFi hotspots 18 while moving. The WiFi hotspots 18 may, however, be included in a communications plan in other ways. Vehicles 12 may connect with a WiFi hotspot 18 when parked, for example in a garage at home or in a public place with a hotspot 18. The vehicle 12 may, during these times of being stationary, update coverage maps, traffic situations, etc. Additionally, e.g., a user of a vehicle 12 may stop in the vicinity of a hotspot 18, and connect to the WiFi hotspot 18 via the mobile device 13. The mobile device 13 may, e.g., download traffic or weather data. The mobile device 13 may then synchronize the data with e.g., a computer in the vehicle 12.

The cellular tower 20 may be used for radio frequency communications in the ultra-high frequency (UHF) range. Cellular communications frequencies may include, e.g., 850, 900, 1,800 and 1,900 mega Hertz (MHz) frequency bands. The cellular towers 20 may be e.g., communicatively coupled with the one or more vehicles 12 and the cloud network 28. Cellular communications may include both voice and data communications. In some cases, cellular communications are only available by subscription, and further may be associated with costs for the length of a connection (e.g., overseas telephone call) or amount of data that is transferred.

The one or more satellite communications networks 22 may include, e.g., one or more communications satellites 24. Each of the communications satellites 24 may be communicatively coupled with the vehicles 12, and with one or more other communications satellites 24. In some cases, the orbits of the communications satellites 24 may be geosynchronous, such that a particular communications satellite 24 is always in a same location relative to the earth. A plurality of communications satellites 24 may be arranged in orbit to provide coverage over a large area. Communications may be relayed from satellite 24 to satellite 24 in order to transmit data point-to-point over long distances. Latency of point-to-point communications over long distances may be high in this type of communications.

Additionally, some communications satellites 24 may have high inclination orbits. These satellites 24 may provide communications to high altitude areas, but, due to their orbits, only be accessible at particular times.

The one or more satellite digital audio radio satellites (SDARS) 26 may be communicatively with the vehicles 12.

The SDARS 26 may broadcast, e.g., a plurality of digital radio channels for the vehicles 12. The vehicles 12 may require a receiver configured to receive the SDARS 26 transmissions. Communications with SDARS 26 may be on a subscription basis.

The cloud network 28 represents one or more mechanisms for connecting the networked devices, and may include one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

The server 30 may be one or more computing devices, each of the computing devices including a processor and a memory, the memory storing instructions which may be executed by the processor. The server 30 may be communicatively coupled to the cloud network 28 and may receive data from and transmit data to, e.g., networked devices such as the one or more vehicles 12.

As described below, the server 30 may collect a variety of types of data, and may generate and maintain one or more coverage maps. For example, the server 30 may collect signal strength data for one or more types of communications at various locations. The server 30 may further collect weather data, satellite location data, etc. The server 30 may additional collect and store geographic maps, maps of cellular tower 20 locations, hotspot 18 locations, maps of dedicated short range communications (DSRC) infrastructure 16 etc.

Based on the collected data, the server 30 may generate and store coverage maps indicating performance distributions, e.g. distributions of signal strengths, distributions of latency, etc., for one or more types of communications. The server 30 may further provide the coverage maps, to the networked devices such as the vehicles 12.

The vehicle 12 is generally a land-based vehicle having two or more wheels, e.g., a passenger car, light truck, motorcycle, etc. The vehicle 12 accordingly generally has a front, a rear, a left side and a right side, wherein the terms front, rear, left and right are understood from the perspective of a user of the vehicle 12 seated in a driver's seat in a standard operating position, i.e., facing a steering wheel.

Figure 2:
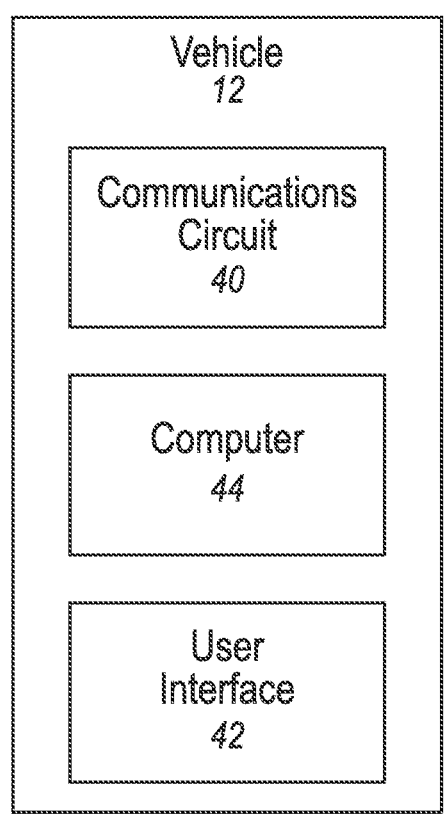
FIG. 2 is a diagram of an exemplary vehicle configured for multiprotocol communications.

As shown in FIG. 2, the vehicle 12 may include a communications circuit 40, a user interface 42 and a computer 44.

The communications circuit 40 may include hardware, software, firmware, etc. and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g. encoding functions, may be realized via firmware.

The types of wireless communications may include WiFi communications, dedicated short range communications (DSRC), two-way satellite communications (e.g., emergency services), one way satellite communications (e.g., receiving digital audio radio broadcasts), AM/FM radio, etc. The communications circuit 40 may include wired or wireless communications, for example, Bluetooth, for connecting to and communicating with a mobile device 13. Additionally, the communications circuit 40 may be communicatively coupled to the computer 44 via, e.g., a wired network such as a controller area network (CAN) bus or local interconnect network (LIN) bus, as is known.

The communications circuit 40 may further include one or more measurement circuits, as are known, for measuring the strength of received signals. The measurement circuits may measure the strength of a received signal, and generate a received signal strength indication (RSSI). The communications circuit 40 may then provide this data, e.g., to the computer 44.

The user interface 42 is communicatively coupled to the computer 44, and may include one or more output devices such as a display, lamps, speakers, etc. for communicating data to the user. The user interface 42 may further include one or more input devices such as buttons, a touch screen display, a mouse, a keyboard, a gesture recognition device, switches, etc., for receiving input from the user.

The user interface 42 may receive input from a user of the vehicle 12 specifying parameters for a trip. For example, the user may specify a destination for the trip, a particular path for a trip, etc. The user may further specify optimization targets for optimizing communications during the trip. For example, the user may specify that communications connections should be optimized to maximize a signal strength or minimize communications costs at each area along a path. Additionally or alternatively, the user may specify, for example, that a trip should be planned to receive a broadcast signal above a predetermined threshold for a particular sports event, or to maximize the availability of rap music stations throughout the trip, etc. The predetermined threshold may be, e.g., a power level above which continuous communications can be expected.

The user interface 42 may also be used to provide data to the user. For example, the computer 40 may display, via the user interface 42, a message to the user that a certain radio station will be out of range within a predetermined period of time, e.g., one minute, and recommend, a substitute radio station with similar content. The user interface 42, may further, for example, indicate that availability of hotspots 18 in an area where the vehicle 12 is travelling, so that the user can, if desired, download data from the cloud network 28.

The computer 44 includes a processor and a memory. The memory includes one or more types of computer-readable media, and storing instructions executable by the processor for performing various operations, including as disclosed herein. Further, the computer 44 may include and/or be communicatively coupled to more than one other computer, including e.g., vehicle components such as the user interface 42 and communications circuit 44. Communications may be performed, e.g., via a controller area network (CAN) bus or local interconnect network (LIN) bus, etc., as is known.

As described in detail below, the computer 44 may be programmed to receive parameters specifying a trip. The parameters may include, e.g., a start location, a destination, and optimization targets for the trip. The optimization targets may include maximizing signal strength of communications during the trip, minimizing costs of communications during the trip, providing access to a particular broadcast during the trip, etc.

The computer 44 may further be programmed to download or retrieve road maps, and download coverage maps from, e.g., the server 30 or memory associated with the computer 44. As described below, the coverage maps may include performance distributions for one or more types of communications.

Based on the trip parameters, road maps, and coverage maps, the computer 44 may be programmed to optimize a trip according to the optimization targets specified by the user. For example, the computer 44 may plan types of communications to be used in different areas along a trip path in order to maximize a received signal strength in each area.

The received signal strength may be determined according to various methods. For example, an average predicted signal strength may be determined along the path based on selected types of communications in respective geographic areas that each include a portion of the path. Alternatively or additionally, a highest minimum signal strength or another statistical measure of signal strength may be used as a basis for optimizing the trip. As the vehicle 12 proceeds along the trip path, the computer 44 may, according to data from the coverage map, send instructions to the communications circuit 40 to switch between different types of communications in different areas.

As another example, the computer 44 may select a path for a trip such that the user will have access for a particular broadcast for the duration of the event. The computer 44 may indicate the appropriate path via, for example the user interface 42. The computer may further, during the trip, select different types of communications in different areas along the path.

The computer 44 may be programmed for other optimizations, such as minimum amount of time with no communications during the trip, maximum availability of up-to-date traffic data during the trip, minimization of communications costs during a trip, etc. The computer 44 may determine an optimum communications type in each area along a path in order to achieve the communications goal, and send instructions to the communications circuit to switch between types of communications.

In addition, the computer 44 may be programmed to provide data, e.g., signal strength data, to the server 30. For example, the computer 44 may receive signal strength indications (RSSI) from the communications circuit 40, and provide the RSSI to the server 30. The server 30 may receive this data, and, e.g., update the coverage map based on the data.

Figure 3:
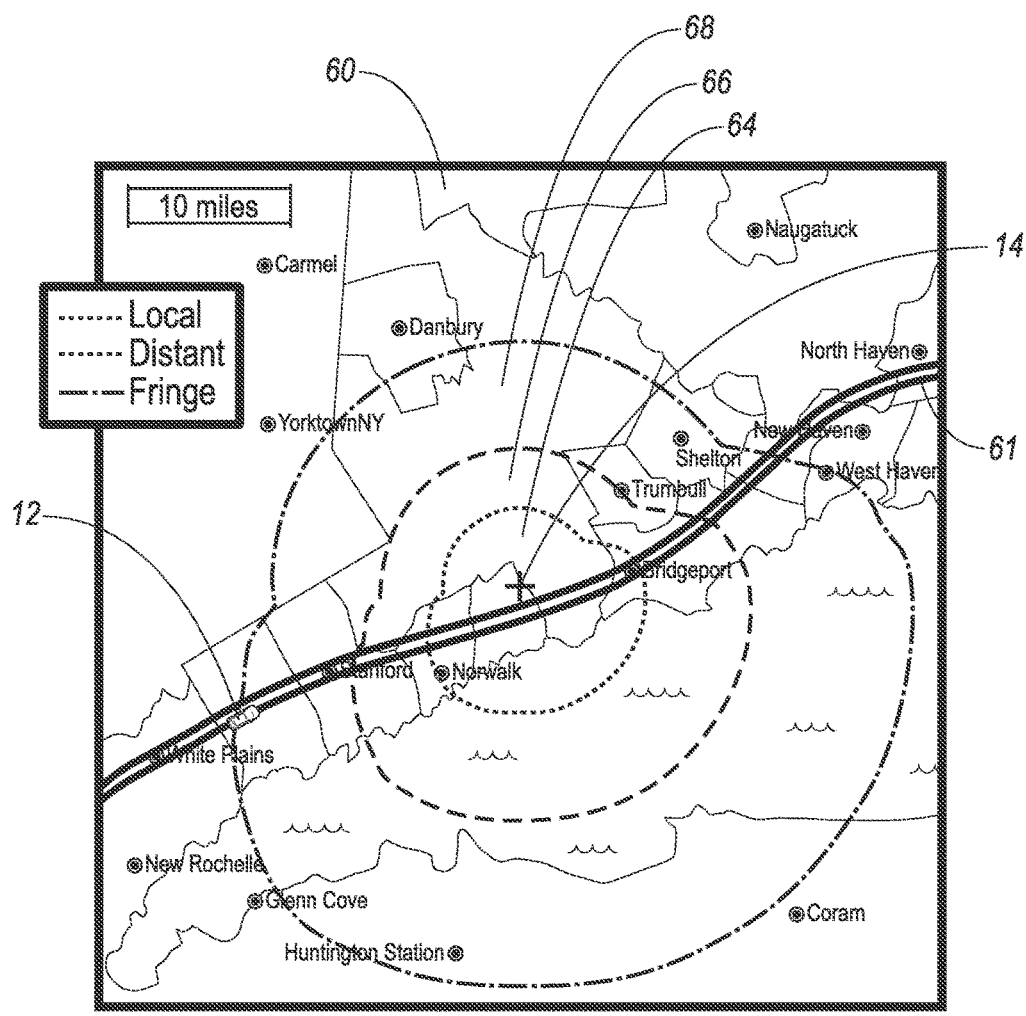
FIG. 3 is an exemplary map indicating a strength of an exemplary radio frequency signal.

FIG. 3 illustrates an exemplary signal strength distribution for a type of communications. A geographic area 60 includes a road 61 traversing the area. The geographic area 60 includes an FM radio transmitter 14. A vehicle 12 is travelling on the road 61 from west to east.

A signal strength distribution for the FM radio transmitter is indicated by the first, second and third ranges 64, 66 and 68. The first range 64 is nearest to the transmitter 14 and indicates an area where the signal from the transmitter is strongest. The first range may be, for example, up to 16 kilometers (km) from the transmitter 14. Most communications circuits including FM radio receivers will be able to receive a strong signal in the first range 64.

The second range 66 is somewhat farther from the transmitter 14, e.g., from 16 to 24 km from the transmitter 14. In this range, it may be it may be necessary to have a good receiver with a good antenna to receive the signal.

The third range 68 is still farther from the transmitter 62, e.g., from 24 to 30 km from the transmitter 14. In this range, only very good receivers and antennas may receive the signal from the transmitter 62. Interference from other signals may be an issue in the third range 68.

Note that the shape of the first, second and third ranges 64, 66, 68 may not be symmetric and may be influenced by geographical features. In a first example, the first, second and third ranges 64, 66, 68 may extend farther from the transmitter 14 over water than they extend over land. Other features, such as hills and the water level below the land may also influence how far one of the ranges 64, 66, 68 extends from the transmitter 62.

As a second example of a signal strength distribution, and still referring to FIG. 3, the transmitter 14 may be an FM radio transmitter including data transmission. For example, in additional to transmitting radio programming (audio), the transmitter 14 may transmit digital traffic and weather reports. In this case, the first range 64 may indicate an area where both high quality audio and the digital traffic and weather reports are available. The second range 66 may indicate an area where audio may can be received, but reception of the digital traffic and weather reports is intermittent. The third range 68 may indicate an area where only low quality audio can be received.

Still referring to FIG. 3, the computer 44 may be programmed to develop and execute a first exemplary communications plan based on the coverage map.

In a first scenario, the vehicle 12 may be travelling west to east. As described in the second example above, the communications circuit 40 in vehicle 12 may be able to receive digital traffic data while in the first range 64. Reception of digital traffic data outside of the first range 64 may be, however, intermittent or not possible. In order to have the best traffic data possible, the computer 44 may store traffic data shortly before exiting the first range 64. The computer 44 may further monitor the traffic data while travelling through the second range 66. In case the computer 44 receives traffic data, the computer 44 may store the updated data. Otherwise, the computer 44 will continue to use the traffic data stored while in the first range 64. In this manner, the computer 44 may have the most up-to-date traffic data which the communications circuit 42 is able to receive.

Figure 4:
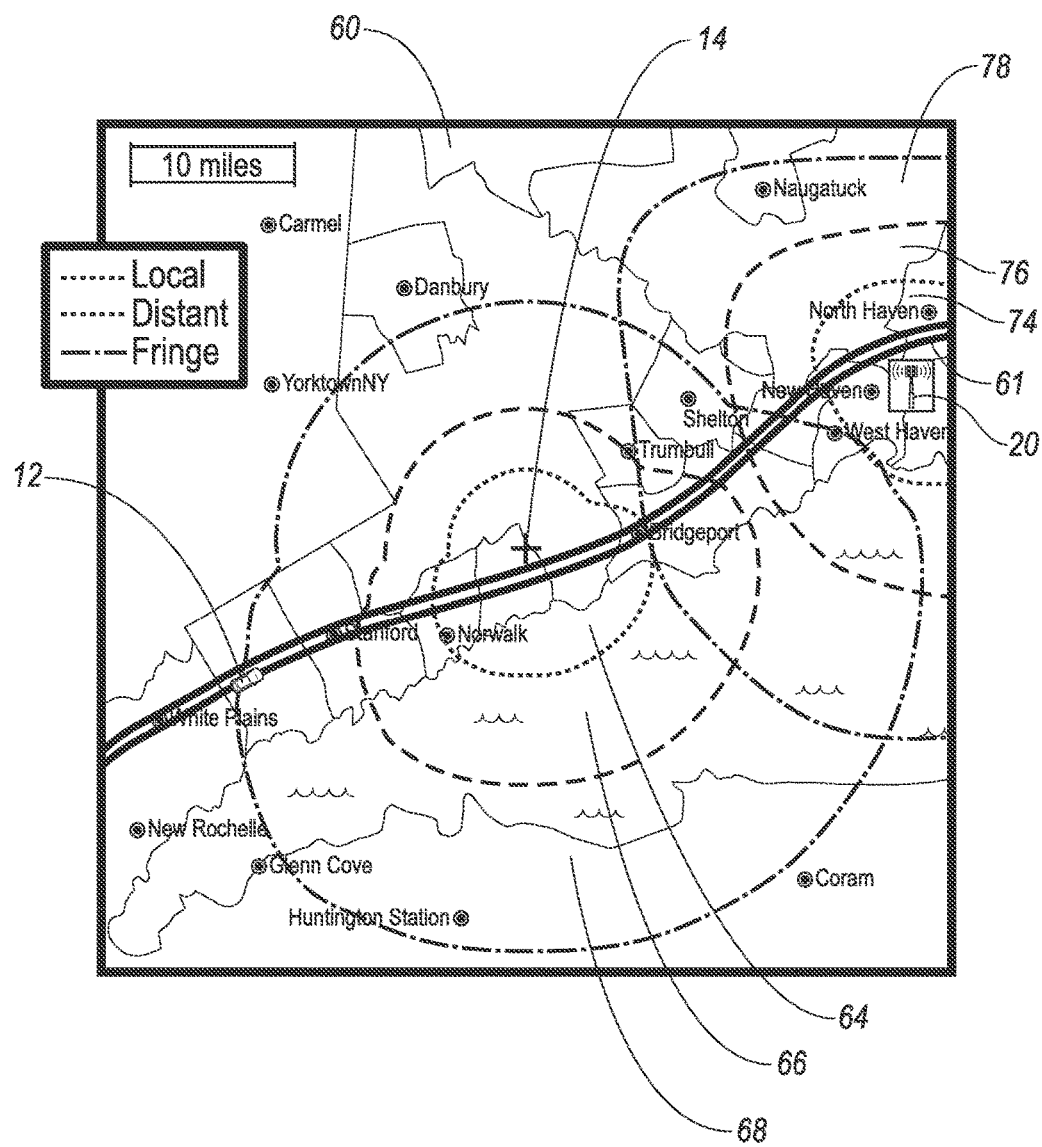
FIG. 4 is an exemplary map indicating the strength of the exemplary radio frequency signal of FIG. 3, and a strength of an exemplary cellular signal.

FIG. 4 includes elements shown in FIG. 3, and further includes a cellular tower 20. The cellular tower 20 may have a signal strength distribution as shown by fourth, fifth and sixth ranges 74, 76, 78. The cellular tower 20 may provide voice, short message service (SMS) and high-speed data services. The high speed data services may include traffic reports.

In the fourth range 74, voice, SMS and high-speed data services may all be available. In the fifth range 76, voice and SMS services may be available, but high-speed data services may be lost. In the sixth range 78, only voice services may be available.

The computer 44 may be programmed to develop and execute a second exemplary communications plan based on the coverage map of FIG. 4.

For example, as in the example above, the vehicle 12 may be travelling from west to east along the road 61. The transmitter 14 may be an FM radio transmitter including digital traffic and weather data. The digital traffic and weather data may be available in the first range 64, but may be intermittent or not available outside of the first range 64.

In a first case, the vehicle computer 44 may, based on the coverage map of FIG. 4, store traffic data when leaving the first range 64. As the vehicle 12 approaches the fourth range 74, the computer 44 may turn on cellular communications, in order to receive traffic data from the cellular tower 20.

When the computer 44 receives, via the communications circuit 40, updated traffic data, the computer 44 may update the stored traffic data.

In a second case, the computer 44 may be programmed, according to received parameters, to reduce communications costs. In this case, the computer 44 may decide not to activate cellular high-speed data reception, and may continue to operate with the stored traffic data.

Figure 5:
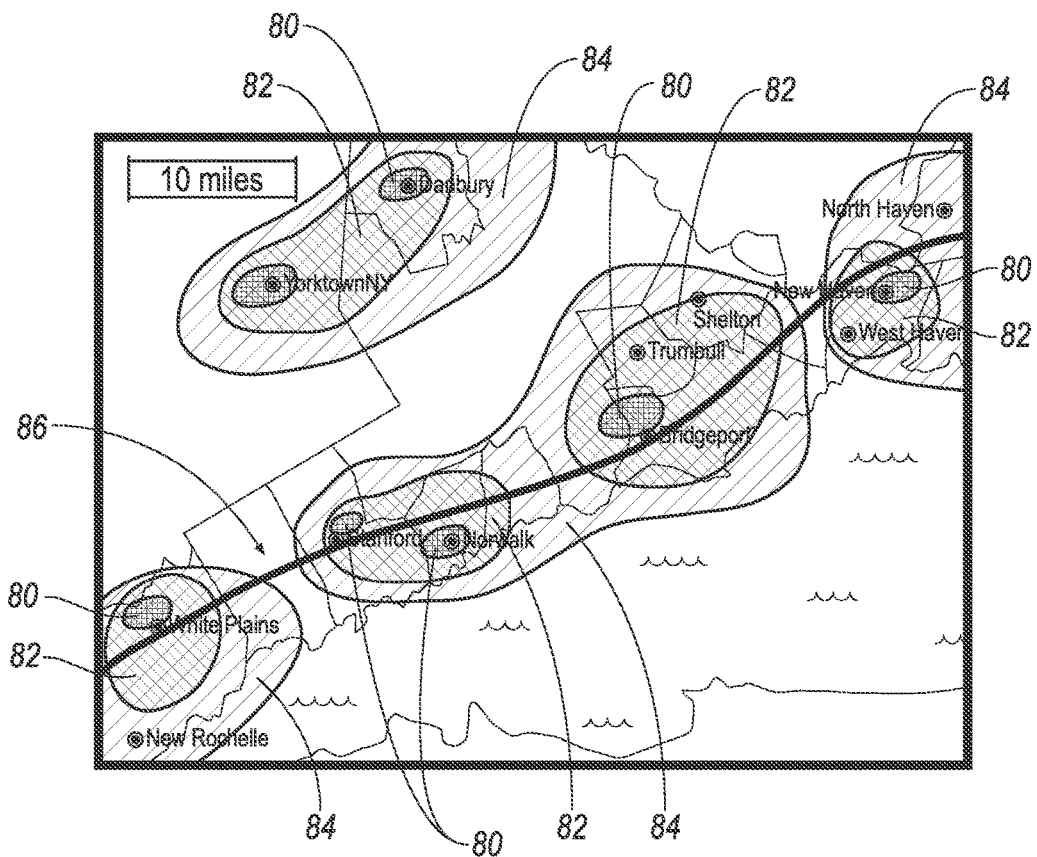
FIG. 5 is an exemplary map indicating a strength of an exemplary cellular signal.

FIG. 5 illustrates an exemplary coverage map for cellular service. First, second and third areas 80, 82, 84 indicate areas with respective strong, intermediate and weak signal strengths. Strong signals indicate high bandwidth for data and a reliable connection. Intermediate signals indicate that bandwidth and connection reliability will be reduced relative to areas with strong signals. Weak signals indicate low bandwidth and an unreliable connection. Fourth areas 86 generally include areas with no or only sporadic access to cellular communications.

The signal strength in a certain location may depend on a distribution of reflectors in the location. Further, the signal strength is influenced by the line-of-sight to a cellular tower 20, depth of the water table, and/or ground water geology of the area.

The speed of the vehicle 12 is also an important factor. For example, a cellular system that is specified for one gigabyte (GB)/second download speed and 0.5 GB/second upload speed for communications with a stationary device (e.g., the vehicle 12). When, however, the vehicle 12 is moving, the expected download and upload speeds may be reduced to 0.1 GB/second due to multipath Doppler effects. These effects are known as Doppler Spread.

A coherence time of a channel is related to the Doppler spread of the channel. When range is limited by coherence the phenomenon is referred to as fast fading and the signal may have temporary deep fade events.

The speed of wireless data is typically also greatly influenced by the backchannel. The backchannel is the series of routers through which data packets are relayed to get to a specific destination. The cellular tower 20, terrestrial network topology and the location of the server 30 in the network 28 are all factors. In order for a first vehicle 12 to send a message to a second vehicle 12 physically next to the first vehicle 12, the message may need to travel through, e.g., 25 routers to reach the server 30, and an additional 25 routers to arrive at the second vehicle 12.

Another important factor is the type of cellular circuitry being used for communications with the cellular tower 20. For example, a mobile device 13 that is primarily designed for voice will have a lower performance than a device built into the vehicle 12 designed for data communications. The position and design of antennas and the direction the vehicle 12 is travelling will also have an impact on the data rate.

Figure 6:
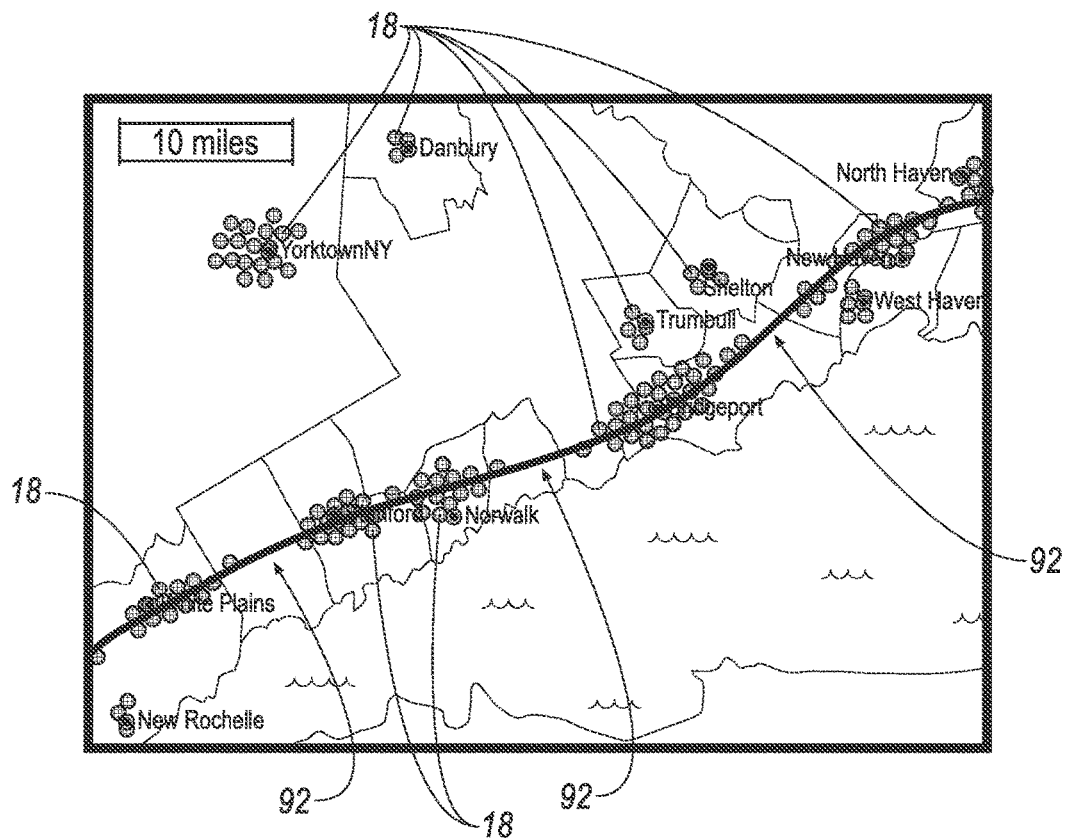
FIG. 6 is an exemplary map indicating an exemplary distribution of internet hotspots.

FIG. 6 illustrates an exemplary coverage map for WiFi hotspots 18. The coverage map indicates a location for each hotspot 18. Areas 92 indicate locations where no hotspot access is available.

Each hotspot 18 has a very short range (generally less than 300 feet) due to the limited power in the frequency band it occupies (typically 2.4 GHz or 5 GHz bands). Equivalent isotopically radiated power (EIRP) in the European Union is limited to 20 dBm (100 milliwatts). WiFi data transfer rates are up to 0.6 GB/second in either direction depending on the equipment being used and the signal strength. Two vehicles 12 connected by WiFi (IEEE 802.11) can communicate with an access point and each other at these speeds. However, typically WiFi is used in stationary settings because the range is limited and connections take several seconds to set up, so mobile devices do not have time to transfer data. Further, while WiFi hotspots 18 typically have a better connection to services on the cloud network 28 than do cellular towers 20, there can still be similar performance problems due to the network backchannel.

A store and forward strategy may be appropriate for WiFi communications. Data is stored on an embedded modem, e.g. a mobile device 13 connected to the vehicle computer 44. The data is synchronized with data stored in web servers 30 when WiFi is available. For example, the vehicle 12 may be parked at home or near an establishment with WiFi access to the cloud network 28. The coverage map helps the user maneuver to an appropriate location in a parking facility, for example for a meal, etc. While the vehicle 12 is not in use, the data is synchronized.

In another strategy, data is stored in a memory of the computer 44 and then synchronized with a mobile device 13. The mobile device 13 is carried to a WiFi hotspot 18 where the data is synchronized with servers 30 via the cloud network 28. The mobile device 13 is then carried back to the vehicle 12 where the process is reversed, i.e., the data on the mobile device 13 is synchronized with the data stored on the computer 44.

Dedicated short range communications (DSRC) is used to communicate between vehicles 12 and/or between vehicles 12 and DSRC infrastructure 16. FIGS. 7A and 7B illustrate the influence of topology on DSRC. FIG. 7A, illustrates a first, second and third vehicle 12a, 12b, 12c travelling on a road which passes over a hill 100. The hill has a hilltop 101. A water table 102 under the hill has a varying water level. DSRC from the first, second and third vehicles 12a, 12b, 12c have respective first, second and third lines-of-sight 103, 105, 107 over the hilltop 101.

FIG. 7B illustrates first, second and third DSRC ranges 104, 106, 108 for the first, second and third vehicles 12a, 12b, 12c. As can be seen, generally, DSRC is strongly influenced by line-of-sight due to relatively high frequency of operation, typically 5.9 GHz. Generally, signal strength for DSRC communications without a direct line-of-sight will be low. This effect may be referred to as slow fading. In slow fading, the received power may be modelled with a log-normal distribution with a standard deviation conforming to a log-distance path loss model.

Additionally, as shown in FIG. 7B, DSRC range is affected by the underlying water table 102. In areas where the underlying water table 102 level is low, e.g., under the third vehicle 12c, the DSRC range 108, will be relatively long. In an area, for example the area under the second vehicle 12b, where the water table 102 level is higher. The range may additionally be affected by other subsurface geological features.

A strategy for communications with the cloud network 28 may be for first vehicle 12 to identify, via DSRC, a second vehicle 12 that is planning to stop at a WiFi hotspot 18. The first vehicle 12 may transmit data to be synchronized with the cloud network 28 to the second vehicle 12. The second vehicle 12 may synchronize the data with the cloud network 28 during the planned stop at the WiFi hotspot 18.

Exemplary Process Flows

Measuring Multiple Types of Communications

FIG. 8 is a diagram of an exemplary process 800 for measuring multiple types of communications. The computer 44 is programmed to collect performance data for each of the multiple types of communications at one or more locations, and provides the collected data to the server 30. The process 800 may be performed, for example, by the computer 44 in the vehicle 12. The process 800 starts in a block 805.

In the block 805, the computer 44 collects global position system (GPS) data associated with the measurement data being taken. For example, the GPS data may include a current location, speed, and direction of travel of a vehicle 12. The GPS data may further include a time and date. The process 800 continues in a block 810.

In the process 810, the computer 44 collects data related to the performance of cellular towers 20 in the current location as described with reference to the process 1000, below. The process continues in a block 815.

In the block 815, the computer 44 collects data related to the performance of digital FM/AM radio transmitters 14 in the current location as described with reference to the process 1100, below. The process 800 continues in a block 820.

In the block 820, the computer 44 collects data related to the performance of the satellite communications network 22 in the current location, as described with reference to the process 1200, below. The process 800 continues in a block 825.

In the block 825, the computer 44 collects data related to the performance of one or more satellite audio radio service (SDARS) satellites 26 in the current location as described with reference to the process 1300, below. The process 800 continues in a block 830.

In the block 830, the computer 44 collects data related to access to WiFi hotspots 18 in the current location as described with reference to the process 1400, below. The process 800 continues with a block 835.

In the block 835, the computer 44 collects data related to the performance of dedicated short range communications (DSRC) 16 in the current location as described with reference to the process 1500, below. The process 800 continues in a block 840.

In the block 840, the computer 44 sends the data collected in the blocks 805 through 835 to the server 30. The process 800 continues in a block 845.

In the block 845, the computer 44 determines if the process 800 should be ended. For example, the computer 44 may be programmed to execute the process 800 once every 10 minutes, and to end the process 800 when the vehicle 12 is turned off. In this case, the computer 44 may wait until 10 minutes has passed, and then return to the block 805. As another example, the computer 44 may be programmed to execute the process 800 based on a request from the server 30. After executing the process 800 one time, the computer 44 may wait for a next request from the server 30. In the case that the vehicle 12 is turned off, e.g., the process 800 ends.

Developing a Crowd Sourced Coverage Map

FIG. 9 is a diagram of an exemplary process 900 for generating a crowd sourced coverage map. The crowd sourced coverage map is based in part on data measured during the process 800 and transmitted from the vehicle 12 to the server 30. The process 900 starts in a block 905.

In the block 905, the server 30 receives the data collected from one or more vehicles 12. The data may be collected from the one or more vehicles 12 and stored. When e.g., a sufficient amount of data is collected, e.g., data from 100 vehicles 12, or a sufficient amount of time has passed, for example thirty minutes, the process 900 may continue in a block 910.

In the block 910, the server 30 receives geographical data. The geographical data may describe an area and include features such as roads, rivers, hills, location of forests, height of water tables, etc. The geographic data may be correlated with the vehicle 12 location. The process 900 continues in a block 915.

In the block 915, the server 30 receives weather data. The weather data may include weather conditions in the area including temperature, humidity, wind speed and direction, dew point, presence of rain, snow, etc. The weather data may be for a specific time, for example, a time of the measurements performed during the process 800. The process continues in a block 920.

In the block 920, the server 30 receives solar data. The solar data may include, e.g., a timing of radiation arriving in the area due to the occurrence of solar storms. The process 900 continues in a block 925.

In the block 925, the server 30 receives data related to SDARS satellite constellation. The data may include, for example, the location, speed of travel and direction of travel of SDARS satellites 26 relative to the area at the time of the measurements performed during process 800. The process 900 continues in a block 930.

In the block 930, the server 30 receives data related to the cellular towers 20. The data may include the location of the cellular towers 20. The data may further include data relating to the operability of the cellular towers 20 at the time of the measurements of the time of the measurements performed during the process 800. For example, a transmission power level may vary during the day, or a cellular tower 20 may be turned off for a period of time for maintenance, etc. The process 900 continues in a block 935.

In the block 935, the server 30 receives data related to the constellation of the satellite network 22. The data may include the location of one or more satellites 24 at the current time, operability data of the one or more satellites 24, etc. The process 900 continues in a block 940.

In the block 940, the server 30 receives data related to one or more hotspots 18 located in the area. The data may indicate, for example, the location of each of the one or more hotspots 18, the operability (e.g., when they are turned on) of each of the one or more hotspots 18, which of the hotspots 18 are password protected, etc. The process continues in a block 945.

In the block 945, the server 30, after collecting data in steps 905 through 940, may transmit the data to another server 30 for generation of the coverage map. Additionally or alternatively, the sever 30 may store the data in a memory associated with the server 30 for additional processing. The process 900 continues in a block 950.

In the block 950, a server 30 generates a coverage map. The coverage map may be based in part on historical data, e.g., a pre-existing coverage map, and further based in part on the data measured by the vehicle 12 during the process 800, and the additional data collected during the process 900.

The coverage map may include a communications model for the vehicle 12, based on, e.g., the vehicle design. The coverage map may further include a channel model characterizing communications between each networked device such as the one or more vehicles 12, one or more AM/FM transmitters 14, one or more DSRC infrastructures 16, one or more WiFi hotspots 18, one or more cellular towers 20, one or more SDARS satellites 26, one or more satellite networks 22, and one or more cloud networks 28 and each other networked device. The channel models may vary based on available data, such as predicted weather conditions, predicted solar conditions, subsurface geological conditions, etc. The coverage map, based on the communications model for each vehicle 12, and the channel models between respective networked devices, may indicate a predicted performance, e.g., a predicted signal strength and a predicted latency for each type of communications at each location within the area.

Upon generating/updating the coverage map, the process 900 may continue in the block 905. The process 900 may operate e.g., substantially continuously, except, e.g., for maintenance operations that require suspending operation, or when disabled by, e.g., an operator of the server 30.

Test Cellular Towers

FIG. 10 is a diagram of an exemplary process 1000 for testing communications with one or more cellular towers 20. The process 1000 may be initiated at the block 810 of the process 800 and starts in a block 1005.

In the block 1005, the computer 44 of the vehicle 12 determines if the communications circuit 40 of the vehicle 12 includes the equipment, i.e., hardware, software, firmware, etc., for communicating with cellular towers 20. The computer 44 may further determine if a subscription is available for cellular services. In the case that the vehicle 12 does not have the equipment, subscription, etc. for cellular communications, the process 1000 ends, and the computer 44 returns to the process 800. In the case that the vehicle 12 has the equipment, subscription, etc. necessary for cellular communications, the process 1000 continues in a block 1010.

In the block 1010, the computer 44 locates one or more cellular towers 20 in range for communications with the vehicle 12. For example, the vehicle 12 may download or retrieve a map indicating the location of cellular towers 20. Additionally or alternatively, the computer 44 may receive and recognize signals from the one or more cellular towers 20. The process 1000 continues in a block 1015.

In the block 1015, the communications circuit 40 measures a received signal strength for incoming signals from each cellular tower 20 and generate a received signal strength indication (RSSI). The communications circuit may send the RSSI to the computer 44. The process 1000 continues in a block 1020.

In the block 1020, the computer 44, via the communications circuit 40, connects to each cellular tower 20 that is within range for cellular communications. The process 1000 continues in a block 1025.

In the block 1025, the computer 44 pings, via a cellular tower 20, the server 30. Based on the response to the ping, the computer 44 may determine a throughput and latency for communications via the cellular tower 20. The computer 44 may perform a ping test for one or more cellular towers 20. The process 1000 continues in a block 1030.

In the block 1030, the computer 44 runs a traceroute to the service hosted on the server 30. The traceroute may indicate a route, e.g., a number and identify of routers, through which a signal passes from the computer 44 to server 30, and from the server 30 to the computer 44. The computer 44 may perform the traceroute for one or more cellular towers 20. The process 1000 continues in a block 1035.

In the block 1035, the computer 44 may disconnect from the cellular towers 20. For example, the computer 44 may send a message to each of the cellular towers 20 indicating that it is ending communications. Additionally or alternatively, the computer 44 stop transmitting cellular communications from the communications circuit 40. The process continues in a block 1040.

In the block 1040, the computer 44 stores the collected and measured data. For example, the computer 44 may store the data collected from process 1000 tests in a memory associated with the computer 44 or in a another computing device communicatively coupled to the computer 44. The process 1000 ends, and the computer 44 may return to the process 800, e.g., to the block 815.

Test Digital AM/FM Stations

FIG. 11 is a diagram of an exemplary process 1100 for testing communications with one or more digital AM/FM stations. The process 1100 may be initiated at the block 815 of process 800 and may start in a block 1105.

In the block 1105, the computer 44 identifies an entry point, i.e., a point for initiating a test of the one or more digital AM/FM stations within range. The entry point may be, for example, a geographic location. The process 1100 continues in a block 1110.

In the block 1110, the computer 44 searches for, and may find, transmitters within range. For example, based on the geographic location, the computer 44 may search signals from known digital AM/FM stations within a reception range, or within, e.g., a particular distance. Additionally or alternatively, the computer 44 may, e.g., sweep the AM and FM frequency bands, and look for signals. In the case that no transmitters 14 are found, the process 1100 ends. The computer 44 returns to the process 800, e.g., to the block 820. In the case that one or more transmitters are located, the process 1100 continues in a block 1115.

In the block 1115, the computer 44 receives station identifiers for each of the signals received during the search conducted in the block 1110. The process 1000 continues in a block 1120.

In the block 1120, the computer 44 generates, based on measurements performed by the communications circuit 40, a received signal strength indication (RSSI) for each received signal. The process 1100 continues in a block 1125.

In the block 1125, the computer 44 tests an audio signal to noise ratio for each FM signal received, and may measure a signal strength for each AM signal received. The process 1100 continues in a block 1130.

In the block 1130, the computer 44 tests the received signals for audio enhancement. The process 1100 continues in a block 1135.

In the block 1135, the computer 44 tests for the availability of digital data, e.g., traffic data, weather data, etc. in each of the received signals. The process 1100 continues in a block 1140.

In the block 1140, the computer 44 stores the collected and measured data. For example, the computer 44 may store the data collected from process 1100 tests in a memory associated with the computer 44 or in a another computing device communicatively coupled to the computer 44. The process 1100 ends, and the computer 44 may return to the process 800, e.g., to the block 820.

Test Satellite Network Communications

FIG. 12 is a diagram of an exemplary process 1200 for testing communications with a satellite communications network 22 including one or more communications satellites 24. The process 1200 may be initiated at the block 820 of process 800 and starts in a block 1205.

In the block 1205, the computer 44 of the vehicle 12 determines if the communications circuit 40 of the vehicle 12 includes equipment, i.e., hardware, software, firmware, etc., for communicating with the satellite network 22. The computer 44 may further determine if a subscription is available for satellite network 22 services. In the case that the vehicle 12 does not have the equipment, subscription, etc. for communications with the satellite network 22, the process 1000 ends. The computer 44 returns to process 800. In the case that the vehicle 12 has the equipment for communications with the satellite communications network 22, the process 1200 continues in a block 1210.

In the block 1210, the computer 44 searches for and may locate communications satellites 24 that are visible, i.e., within range for communications. For example, the computer 44 may receive and recognize signals from one or more communications satellites 24. Additionally or alternatively, the computer 44 may send queries to the communications satellites 24, and look for responses. In the case that no satellites 24 are found, the process 1200 ends. The computer 44 returns to the process 800, e.g., to the block 825. In the case that one or more satellites 24 are located, the process 1200 continues in a block 1215.

In the block 1215, the computer 44 receives, for one or more of the located communications satellites 24, data identifying the respective communications satellite 24. The process 1200 continues in a block 1220.

In the block 1220, the computer 44 receives the signal strength indication (RSSI) from each communications satellite 24. For example, the communications circuit 40 may measure a received signal strength for incoming signals from each communications satellite 24 and provide the data to the computer 44. The process 1200 continues in a block 1225.

In the block 1225, the computer 44 attempts to connect to each communications satellite 24 which is within a range for communications. For example, the computer 44 may, via the communications circuit 40, transmit a message to the each communications satellite 24 requesting a response. The computer 44 may listen for a response. The process 1200 continues in a block 1230.

In the block 1230, the computer 44 executes a ping and a traceroute for one or more of the communications satellites 24. Based on a ping test with, e.g., a server 30, the computer 44 may determine a latency and throughput between the computer 44 and the server 30 via a particular communications satellite 24. Based on a traceroute, the computer 44 may determine a number and identity of routers used to relay, via a particular communications satellite 24, a signal from the computer 44 to the server 30 and from the server 30 to the computer 44. The process 1200 continues in a block 1235.

In the block 1235, the computer 44 stores the collected and measured data. For example, the computer 44 may store the data collected from process 1200 tests in a memory associated with the computer 44 or in a another computing device communicatively coupled to the computer 44. The process 1200 ends, and the computer 44 may return to the process 800, e.g., to the block 825.

Test Satellite Digital Audio Radio Service (SDARS)

FIG. 13 is a diagram of an exemplary process 1300 for testing access to one or more satellite digital audio radio service (SDARS) satellites 26. The process 1300 may be initiated at the block 825 of process 800 and may start in a block 1305.

In the block 1305, the computer 44 of the vehicle 12 determines if the communications circuit 40 of the vehicle 12 includes the equipment, i.e., hardware, software, firmware, etc., for SDARS communications. The computer 44 may further determine if a subscription is available for SDARS services. In the case that the vehicle 12 does not have the equipment, subscription, etc. for communications with the SDARS services, the process 1300 ends. The computer 44 returns to process 800. In the case that the vehicle 12 has the equipment, subscription, etc. necessary for SDARS communications, the process 1300 continues in a block 1310.

In the block 1310, the computer 44 searches for and may locate SDARS satellites 26 that are visible, i.e., within range for communications. For example, the computer 44 may receive and recognize signals from one or more SDARS satellites 26. In the case that no SDARS satellites 26 are found, the process 1300 ends. The computer 44 returns to the process 800, e.g., to the block 830. In the case that one or more SDARS satellites 26 are located, the process 1300 continues in a block 1315.

In the block 1315, the computer 44 may receive data identifying each of the SDARS satellites 26 from which the computer 44 received a signal. The process 1300 continues in a block 1320.

In the block 1320, the computer 44 receives the received signal strength indication (RSSI) from each SDARS satellites 26. For example, the communications circuit 40 may measure a received signal strength for incoming signals from each SDARS satellites 26 and provide the data to the computer 44. The process 1200 continues in a block 1325.

In the block 1325, the computer 44 attempts to connect to each SDARS satellites 26. For example, the computer 44 may, via the communications circuit 40, transmit a message to the each SDARS satellites 26 requesting a response. The computer 44 may listen for a response. The process 1300 continues in a block 1330.

In the block 1330, the computer 44 tests for audio media quality for signals received from each of the SDARS satellites with which the computer established communications. The process 1300 continues in a block 1335.

In the block 1335, the computer 44 test for the availability of digital data, e.g., traffic data, weather data, etc. in each of the received signals. The process 1300 continues in a block 1340.

In the block 1340, the computer 44 stores the collected and measured data. For example, the computer 44 may store the data collected from process 1300 tests in a memory associated with the computer 44 or in a another computing device communicatively coupled to the computer 44. The process 1300 ends, and the computer 44 may return to the process 800, e.g., to the block 830.

Test WiFi Hotspot Access

FIG. 14 is a diagram of an exemplary process 1400 for testing access to one or more WiFi hotspots 18. The process 1400 may be initiated at the block 830 of process 800 and starts in a block 1405.

In the block 1405, the computer 44 of the vehicle 12 may determine if the communications circuit 40 of the vehicle 12 includes the equipment, i.e., hardware, software, firmware, etc., for WiFi communications. In the case that the vehicle 12 does not have the equipment for WiFi communications, the process 1400 ends. The computer 44 returns to process 800. In the case that the vehicle 12 has the equipment for WiFi communications, the process 1400 continues in a block 1410.

In the block 1410, the computer 44 searches for and may locate WiFi hotspots 18 within range for communications. The computer 44 may, e.g., identify one or WiFi hotspots that may be within a distance of the vehicle 12 based on a map of WiFi hotspots 18. Further, for example, the computer 44 may receive and recognize signals from one or more hotspots 18. In the case that no hotspots 18 are found, the process 1400 ends. The computer 44 returns to the process 800, e.g., to the block 835. In the case that one or more hotspots 18 are located, The process 1400 continues in a block 1415.

In the block 1415, the computer 44 receives data identifying the service set identifier (SSID) and media access control (MAC) address of each hotspot 18 from which the computer 44 received a signal. The process 1400 continues in a block 1420.

In the block 1420, the computer 44 receives the received signal strength indication (RSSI) from hotspot 18. The communications circuit 40 may measure a received signal strength for incoming signals from each hotspot 18 and provide the data to the computer 44. The process 1400 continues in a block 1425.

In the block 1425, the computer 44 attempts to connect to each hotspot 18 using a stored certificate. For example, the computer 44 may, via the communications circuit 40, transmit a message to the each hotspot 18. The message may include, if available, a certificate for accessing the hotspot 18. The certificate may be, for example, a password for connecting to the hotspot 18. The computer 44 may listen for a response. The process 1400 continues in a block 1430.

In the block 1430, the computer 44 executes a ping and traceroute with each hotspot 18 with which it was able to establish a connection. Based on a ping test with, e.g., a server 30, the computer 44 may determine a latency and throughput between the computer 44 and the server 30 via a hotspot 18. Based on a traceroute, the computer 44 may determine a number and identity of routers used, via a particular hotspot 18, to relay a signal from the computer 44 to the server 30, and from the server 30 to the computer 44 via the hotspot 18. The process 1400 continues in a block 1435.

In the block 1435, the computer 44 stores the collected and measured data. For example, the computer 44 may store the data collected from process 1400 tests in a memory associated with the computer 44 or in a another computing device communicatively coupled to the computer 44. The process 1400 ends, and the computer 44 may return to the process 800, e.g., to the block 835.

Test for Dedicated Short Range Communications (DSRC) Devices within Range

FIG. 15 is a diagram of an exemplary process 1500 for identifying one or more dedicated short range communications (DSRC) devices that are within communication range of the vehicle 12. The process 1500 may be initiated at the block 835 of process 800 and starts in a block 1505.

In the block 1505, the computer 44 of the vehicle 12 determines if the communications circuit 40 of the vehicle 12 includes the equipment, i.e., hardware, software, firmware, etc., for DSRC communications. In the case that the vehicle 12 does not have the equipment for DSRC communications, the process 1500 ends. The computer 44 returns to process 800. In the case that the vehicle 12 has the equipment for DSRC communications, the process 1500 continues in a block 1510.

In the block 1510, the computer 44 searches for and may locate one or more DSRC devices within range for communications. For example, the computer 44 may listen for and receive one or more signals from DSRC devices. In the case that no DSRC devices are found, the process 1500 ends. The computer 44 returns to the process 800, e.g., to the block 840. In the case that one or more DSRC devices are located, the process 1500 continues in a block 1515.

In the block 1515, the computer 44 receives data identifying one or more DSRC devices from which it received a respective signal. The data may further include e.g., global positioning data related to the DSRC 16, such as a location of the DSRC device, a direction and rate of travel, etc. The process 1500 continues in a block 1520.

In the block 1520, the computer 44 receives the signal strength indication (RSSI) from each DSRC device. The communications circuit 40 may measure a received signal strength for incoming signals from DSRC device and provide the data to the computer 44. The process 1500 continues in a block 1525.

In the block 1525, the computer 44 receives route data from each DSRC device. The route data may indicate, e.g., an intended path of travel. The process 1500 continues in a block 1530.

In the block 1540, the computer 44 stores the collected and measured data. For example, the computer 44 may store the data collected from process 1500 tests in a memory associated with the computer 44 or in a another computing device communicatively coupled to the computer 44. The process 1500 ends, and the computer 44 may return to the process 800, e.g., to the block 840.

Determining and Executing a Communications Plan Based on a Coverage Map

FIG. 16 is a diagram of an exemplary process 1600 for determining and executing a communications plan based on a coverage map. The process 1600 starts in a block 1605.

In the block 1605, the computer 44 of the vehicle 12 receives a travel path or an update to a travel path. For example, a user of the vehicle 12 may enter a travel path via the user interface 42. Alternatively or additionally, the user may enter a destination into a global positioning unit which may generate the travel path, and provide the travel path to the computer 44. The travel path may include the map of the roads that will be taken from the current location to the destination. The travel plan may further include, e.g., the estimated time of departure, intended stops, etc. The process 1600 continues in a block 1605.

In the block 1605, the computer 44 may receive targets for optimizing communications (optimization targets). For example, the user may indicate via the user interface that the user would like to maximize signal strength of connections along the path in order to have, e.g., reliable traffic data along the route. As another example, the user may indicate that the user wants to minimize data costs, and that data download charges should be avoided. As yet another example, the user may wish to optimize communications in order to have continuous access to jazz music during the trip. The process 1600 continues in a block 1615.

In the block 1615, the computer 44 downloads a coverage map. For example, the computer 44 may transmit, to the server 30, a request for a coverage map for the geographic area along the travel path. The coverage map may include performance distributions for one or more types of communications, as described above. The performance distributions may include signal strength distributions, latency distributions, etc. related to each type of communications. The process 1600 continues in a block 1620.

In the block 1620, the computer 44 identifies communications routes from recently collected data. For example, the computer 44 may initiate searches for the availability of different types of communications as described above. Based on the searches, the computer 44 may identify one or more types of communication that are available in a particular area that are not included on the coverage map, or conversely, that types of communication that are indicated as available on the coverage map cannot be located. The process 1600 continues in a block 1625.

In the block 1625, the computer 44 identifies and executes a communications plan the trip. The computer 44 may identify one or more areas along the travel path. For each area, the compute 44 may identify one or more types of communications that may be used, in accordance with the optimization targets.

For example, the communications goal may to maximize signal strength in each area in order to receive reliable and up-to-date traffic data. A secondary goal may be to minimize communications costs.

In a first area, the computer 44 identifies that FM radio including traffic data is available. The computer 44 may turn on an FM receiver to receive the traffic update.

In a second area, the computer 44 identifies that no FM radio is available, but that cellular communications are available which include traffic data. The computer 44 may switch from the FM radio station to the cellular tower to receive traffic update.

In a third area, traffic data from both FM radio and cellular communications may be available. The computer 44 may switch to the FM radio station in order to avoid data costs associated with the cellular communications.

In some cases, the communications plan may include storing data in anticipation of an area where no data is available. For example, in the case that the computer 44 anticipates that no traffic data may be available in an area along the travel path, the computer 44 may download and store traffic data immediately prior to entering the area without the traffic data.

The communications plan may further include optimizing, for example, use of hotspots 18. For example, based on a planned stop at a location at a hotspot 18, the computer 44 may plan to download data, e.g., up-to-date weather date, an up-to-date coverage map, etc. when the vehicle 12 is stopped at the hotspot 18. The process 1600 continues in a block 1635.

In the block 1635, the computer 44 may determine if the process 1600 should continue. For example, in the case the vehicle 12 is continuing to move, or is stopped at an intermediate location along the travel path, the computer 44 may determine that the process 1600 should continue. The process 1600 may return, e.g., to the block 1605.

On the other hand, the computer 44 may determine that the vehicle 12 has reached its destination, or, e.g., that the user has indicated via the user interface 42 that the process 1600 should end. In this case, the process 1600 ends.

Determining a Travel Path Based on a Coverage Map and Optimization Targets

FIG. 17 is a flow diagram of an exemplary process 1700 to determine a travel path based on a coverage map and optimization targets. The process 1700 starts in a block 1705.

In the block 1705, the computer 44 receives parameters specifying a trip. For example, the computer 44 may receive a trip destination from a user via the user interface 42. Further, the computer 44 may receive the current location, for example from global positioning data. The computer 44 may also receive other parameters, such as the intended time of starting the trip, the estimated time of arrival, number of planned stops, etc. The computer 44 may also download or retrieve a road map indicating potential travel paths from the current location to the destination, as is known. The process 1700 continues in a block 1710.

In the block 1710, the computer 44 receives one or more optimization targets. As described above, the optimization targets generally describe an optimization of vehicle 10 communications, e.g., to maximize connectivity during the trip, minimize costs during the trip, maximize the availability of a certain type of entertainment, or a certain type of data, etc. The process 1700 continues in a block 1715.

In the block 1715, the computer 44 downloads a coverage map. The coverage map may be a map of the area through which the vehicle 12 will travel from the current location to the destination, and may include performance distributions for one or more types of communications, as described above. The process continues in a block 1720.

In the block 1720, the computer 44 selects a travel path, based on the optimization targets. The computer 44 may identify two or more potential travel paths from the current location to the destination. The computer 44 may evaluate each of the potential travel paths according to the optimization targets. Based on the evaluation, the computer 44, may select, from the potential travel paths, the travel path which best corresponds to the optimization targets.

For example, a communications goal may be to receive a radio transmission of a football game from 2 pm to 5:30 pm during the trip. The computer 44 may identify a first path and a second path from the current location to the destination. Based on the coverage map, the computer 44 may determine that areas along the first path during the specified time do not have access to a radio transmission of the football game, but that each area along the second path during the specified time will have access to digital FM radio including game coverage. The computer 44 may, according to this determination, recommend the second travel path to the user. Upon making a travel path recommendation, the process 1700 ends.

Optimizing the Transmission of Data Based on a Coverage Map

FIG. 18 is a flow diagram of an exemplary process 1800 to optimize the transmission of data based on a coverage map. The process 1800 starts in a block 1805.

In the block 1805, the computer 44 of the vehicle 12 receives a travel path or an update to a travel path. For example, a user of the vehicle 12 may input a travel path via the user interface 42. Alternatively or additionally, the user may enter a destination into a global positioning unit which may generate, and provide the travel path to the computer 44. The travel path may include a map of the roads that will be taken from the current location to the destination. The travel path may further include, e.g., the estimated time of departure, intended stops, etc. The process 1800 continues in a block 1810.

In the block 1810, the computer 44 receives parameters specifying optimization targets. For example, the optimization targets may include updating social media sites on a close to real time basis. As another example, the optimization targets may include uploading files with large amounts of data, for example, files with more than 10 megabytes (Mbytes) of data, without incurring data transmission costs. The process 1800 continues in a block 1815.

In the block 1815, the computer 44 downloads a coverage map. For example, the computer 44 may transmit, to the server 30, a request for a coverage map for the geographic area along the travel path. The coverage map may include performance distributions for one or more types of communications, as described above. The performance distributions may include signal strength distributions, latency distributions, etc. related to each type of communications. The process 1800 continues in a block 1820.

In the block 1820, the computer 44 identifies communications routes from recently collected data. For example, the computer 44 may initiate searches for the availability of different types of communications as described above. Based on the searches, the computer 44 may identify one or more types of communication that are available in a particular area that are not included on the coverage map, or conversely, that types of communication that are indicated as available on the coverage map are not available. The process 1800 continues in a block 1825.

In the block 1825, the computer 44 identifies one or more communications routes for one or more areas along the travel path. For example, the computer 44 may identify first and second cellular communications routes available respectively in first and second areas along the travel path. The computer 44 may further identify, for example, a first hotspot 18 at an intended or potential stopping point along the travel path. The process continues in a block 1830.

In some cases, the vehicle 12 considers additional communications routes that are not part of the intended travel plan. For example, in a case where the vehicle 12 has access to a second hotspot 18 when parked at home, the computer 44 may, for example include the second hotspot 18 as an option for communicating messages that are not time sensitive.

In the block 1830, the computer 44 creates a data queue for each of the identified communications routes along the travel path. Each queue may be used to store messages that are intended to be transferred via the communications route. For example, the computer 44 may create a first queue for the first cellular communications route, a second queue for the second cellular communications route, and a third queue for the identified hotspot 18 along the travel path. The process 1800 continues in a block 1835.

In the block 1835, the computer 44 places messages in each of the respective queues. For example, while travelling in the first area, the computer 44 may place messages with small amounts of data, such as interactions with social media sites, or emails, etc. in the first queue for the first cellular communications route. The computer 44 may place messages with large amounts of data, for example a video to be uploaded, in the third queue for the hotspot 18 communications route.

Further, when, e.g., the vehicle 12 is nearing a border of the first area, and tis thus approaching the second area, the computer 44 may, for example, place messages with small amounts of data in the second queue for the second communications route.

One or more criteria may be used to select a proper communications route. For example, voice communications may be sensitive to latency and require a communications route with low latency, while text messages may be more tolerant to latency, and may be transmitted on a communications route with higher latency but lower cost. Some data may not be time sensitive, and may, for example, be placed in a general queue for hotspot 18 access, and remain there until such time as the vehicle 12 is in the range of a hotspot 18, etc.

When the messages have been placed in queues, the process 1800 continues in a block 1840.

In the block 1840, the computer 44 sends the messages. The process continues in a block 1845.

In the block 1845, the computer 44 determines if the process 1800 should continue. For example, the process 1800 may continue as long as data remains in one of the data queues, or as long as the vehicle 12 is moving or turned on. In the case that the data queues are empty, and the vehicle 12 is not moving or turned on, the process 1800 may end.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many types, including, but not limited to, non-volatile media, volatile media, etc. Non-volatile media include, for example, optical or magnetic disks and other persistent memory. Volatile media include dynamic random access memory (DRAM), which typically constitutes a main memory. Common types of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor in a first vehicle and a memory, the memory storing instructions executable by the processor such that the processor is programmed to:
   receive, via a radio frequency communications circuit in the first vehicle communicatively coupled with the processor via a wired vehicle network, data mapping one or more predicted signal metrics for each of one or more types of wireless communications within a geographic area;
   determine an availability of the first vehicle communicating with a second vehicle;
   select, for the first vehicle travelling along a planned path within the geographic area, based on one or more optimization targets, a respective one of the types of communications to be used respectively for each of one or more areas along the planned path, the types of communications including the first vehicle communicating with the second vehicle; and
   activate the selected type of communications when the first vehicle is within the respective area.

2. The system of claim 1, wherein the processor is further programmed to:
   determine, based on the data, a first type of communications with a first area best correlation with the one or more optimization targets in a first area and a second type of communications with a second area best correlation with the one or more optimization targets in a second area contiguous with the first area; and
   switch the communications circuit in the first vehicle from the first type of communications to the second type of communications as the first vehicle moves from the first area to the second area.

3. The system of claim 1, wherein the mapping of predicted signal metrics includes a mapping of at least one of a predicted signal strength and a predicted signal latency.

4. The system of claim 1, wherein the one or more types of wireless communications include one or more of cellular communications, satellite communications, local area radio frequency communications, vehicle-to-vehicle communications, and digital radio frequency communications.

5. The system of claim 1, wherein the one or more optimization targets includes optimizing the predicted received signal strength along the planned travel path and the processor is further programmed to:
   determine, based on the data, a first type of communications with a first area greatest predicted received signal strength in a first area and a second type of communications with a second area greatest predicted received signal strength in a second area contiguous with the first area; and
   switch a communications circuit in the first vehicle from the first type of communications to the second type of communications as the vehicle moves from the first area to the second area.

6. The system of claim 1, wherein the set of predetermined goals includes minimizing the costs of communications along the planned path of travel and the processor is further programmed to:
   determine, based on the data, a first type of communications with a first area lowest predicted cost in a first area and a second type of communications with a second area lowest predicted cost in a second area contiguous with the first area; and
   switch the communications circuit in the first vehicle from the first type of communications to the second type of communications as the vehicle moves from the first area to the second area.

7. The system of claim 1, wherein the processor is further programmed to:
   identify a first area along the path with at least one type of communications with a predicted signal strength sufficient to be received;
   identify a second area along the path contiguous with and following the first area, without a type of communications with a predicted signal strength sufficient to be received; and
   collect data related to the second area while travelling in the first area; and
   store the data for use during travel in the second area.

8. The system of claim 1, wherein the processor is further programmed to:
   identify, based on the communications map, an area along the path where a predicted strength of a global positioning signal may not be sufficient to be received; and
   activate an inertial based positioning system prior to the first vehicle entering the area.

9. The system of claim 1, wherein the processor is further programmed to:
   determine that a received signal strength for a type of communications is outside of a predicted range at a given location; and
   transmit an indication to a remote server that the received signal is outside of the predicted range.

10. The system of claim 1, wherein the processor is further programmed to:
    create, for one or more types of communications along the path, a queue for messages to be transmitted by the respective type of communications,
    receive a message to be transmitted; and
    select a queue for storing the message based on characteristics of the message.

11. The system of claim 10, wherein the processor is further programmed to:
    store the message in the queue;
    identify that the type of communications associated with the queue is available; and
    transmit the message via the type of communications.

12. The system of claim 1 further comprising a second computer including a processor and a memory, the memory of the second computer storing instructions executable by the processor of the second computer such that the processor of the second computer is programmed to:
    receive, from the computer, a request for data representing at least one mapping of predicted signal metrics for at least one type of wireless communications within the geographic area; and
    transmit the data representing the at least one mapping to the computer.

13. The system of claim 12, wherein the processor of the second computer is further programmed to:

receive current data representing current signal metrics for one of the at least one type of wireless communications within the geographic area from one or more other computers; and modify a mapping of the predicted signal metrics for the one type of wireless communications based at least in part on the received current data.

14. The system of claim 12, wherein the processor of the second computer is further programmed to:

receive data representing at least one of subsurface geology, subsurface water table, predicted weather conditions and predicted solar conditions for a particular time and a particular location in the geographic area; and modify a mapping of the predicted signal metrics for one or more types of wireless communications for the particular time and the particular location based at least in part on the received data representing at least one of subsurface geology, subsurface water table, predicted weather conditions and predicted solar conditions.

15. A system comprising a computer in a first vehicle including a processor and a memory, the memory storing instructions executable by the processor such that the processor is programmed to:

receive, via a radio frequency communications circuit in the vehicle communicatively coupled with the processor via a wired vehicle network, data mapping one or more predicted signal metrics for each of one or more types of wireless communications within a geographic area;

determine an availability of the first vehicle communicating with a second vehicle;

receive a destination for the vehicle; and plan a path for the first vehicle in order to optimize communications during a trip from a current location to the destination, according to one or more optimization targets.

16. The system of claim 15, wherein the mapping of predicted signal metrics includes a mapping of at least one of a predicted signal strength and a predicted signal latency.

17. The system of claim 15, wherein the one or more types of wireless communications include one or more of cellular communications, satellite communications, local area radio frequency communications, vehicle-to-vehicle communications, and digital radio frequency communications.

18. The system of claim 15, wherein the optimization targets include, optimizing a predicted received signal strength along the planned travel path and the processor is further programmed to:

identify a first and second potential path from the current location to the destination;

determine a potential communications plan for each of the first and second potential paths, the respective potential communication plan including one or more selected types of communication for each area along the respective potential path;

select the potential path with the greatest predicted received signal strength.

19. The system of claim 18, wherein the processor is further programmed to:

actuate the one or more selected types of communications for each respective area when the first vehicle is within the respective area.

20. The system of claim 18, wherein selecting the potential path with the greatest predicted received signal strength includes;

identifying a first area with a weakest predicted signal strength along the first potential path and a second area with a weakest predicted signal strength along the second potential path;

determining that the predicted signal strength in the first area is stronger than the predicted signal strength at the second area; and including, based on determination, the first potential path in the plan.

21. The system of claim 15, wherein the processor is further programmed to:

receive data from a mobile device communicatively coupled with the computer; and include the data in planning the travel path.

22. The system of claim 21, wherein the processor is further programmed to:

identify a WiFi hotspot for the mobile device along the planned path; and recommend to a user, via a user interface included in the vehicle, to connect the mobile device to the WiFi hotspot.

23. The system of claim 15 further comprising a second computer including a processor and a memory, the memory of the second computer storing instructions executable by the processor of the second computer such that the processor of the second computer is programmed to:

receive, from the computer, a request for data representing at least one mapping of predicted signal metrics for at least one type of wireless communications within the geographic area; and transmit the data representing the at least one mapping to the computer.

24. The system of claim 23, wherein the processor of the second computer is further programmed to:

receive current data representing current signal metrics for one of the at least one type of wireless communications within the geographic area from one or more other computers; and modify a mapping of the predicted signal metrics for the one type of wireless communications based at least in part on the received current data.

25. A system, comprising a computer in a vehicle, the computer including a processor and a memory, the memory storing instructions executable by the processor such that the processor is programmed to:

receive data mapping one or more predicted signal metrics for each of one or more types of wireless communications within a geographic area, wherein the one or more types of communications include first and second radio station channels;

determine, based on a current direction and speed of travel, that the vehicle will be leaving a range to receive a first signal with a first predicted strength above a first predetermined threshold from the first radio station channel within a first predetermined period of time;

prevent a radio tuner from selecting the first radio station channel, based on the determination that the vehicle will be leaving the range to receive the first signal;

determine, based on the current direction and speed of travel, that the vehicle will further be within range to receive a second signal with a second predicted strength above a second predetermined threshold from the second radio station channel for a second predetermined period of time; and instruct the radio tuner to select the second radio station channel.

\* \* \* \* \*